(12) United States Patent
Kim et al.

(10) Patent No.: US 12,435,460 B2
(45) Date of Patent: Oct. 7, 2025

(54) DETERGENT SUPPLY DEVICE FOR CLOTHES PROCESSING APPARATUS

(71) Applicant: Samsung Electronics Co., Ltd., Suwon-si (KR)

(72) Inventors: Byeongwoo Kim, Suwon-si (KR); Doyun Lee, Suwon-si (KR); Geonhui Jo, Suwon-si (KR); Jonghun Sung, Suwon-si (KR); Kwangmin Chun, Suwon-si (KR); Youngchul Jo, Suwon-si (KR); Woojin Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 33 days.

(21) Appl. No.: 18/599,065

(22) Filed: Mar. 7, 2024

(65) Prior Publication Data

US 2024/0209559 A1 Jun. 27, 2024

Related U.S. Application Data

(63) Continuation of application No. PCT/KR2022/013485, filed on Sep. 7, 2022.

(30) Foreign Application Priority Data

Oct. 26, 2021 (KR) .................. 10-2021-0143678

(51) Int. Cl.
*F16K 15/16* (2006.01)
*D06F 39/02* (2006.01)
*F16K 15/06* (2006.01)

(52) U.S. Cl.
CPC .......... *D06F 39/022* (2013.01); *F16K 15/063* (2013.01)

(58) Field of Classification Search
CPC .............................. D06F 39/022; F16K 15/063
See application file for complete search history.

(56) References Cited

U.S. PATENT DOCUMENTS

| 5,240,036 A | 8/1993 | Morris |
| 5,331,986 A | 7/1994 | Lim et al. |
| (Continued) | | |

FOREIGN PATENT DOCUMENTS

| CN | 203977162 U | 12/2014 |
| CN | 206109793 U | 4/2017 |
| (Continued) | | |

OTHER PUBLICATIONS

International Search Report and Written Opinion of the International Searching Authority dated Jan. 4, 2023, in connection with International Application No. PCT/KR2022/013485, 9 pages.

*Primary Examiner* — P. Macade Nichols

(57) ABSTRACT

Disclosed herein is a detergent supply device for a clothes treating apparatus including a detergent container, a detergent pump module including a detergent pump and configured to communicate with a valve opening, a valve body configured to communicate with the detergent container at one end thereof, a plunger provided to be movable within the valve body, an opening and closing member provided on the plunger to open or close the valve opening in response to a movement of the plunger, and a sealing member including an outer circumferential sealing portion covering an outer circumferential surface of the valve body, an opening sealing portion extending from the outer circumferential sealing portion to cover at least a portion of an end of the valve body and forming the valve opening, and a sub-sealing portion provided integrally with the valve opening at an end of the opening sealing portion and contacting the opening and closing member when the valve opening is closed.

20 Claims, 17 Drawing Sheets

(56) References Cited

U.S. PATENT DOCUMENTS

| | | |
|---|---|---|
| 10,465,327 B2 | 11/2019 | Lv et al. |
| 11,078,616 B2 | 8/2021 | Ryu et al. |
| 11,214,912 B2 | 1/2022 | Jung et al. |
| 11,525,205 B2 | 12/2022 | Jung et al. |
| 11,634,852 B2 | 4/2023 | Choi et al. |
| 2005/0000254 A1 | 1/2005 | Rotta et al. |
| 2012/0096901 A1 | 4/2012 | Zattin et al. |
| 2016/0258106 A1 | 9/2016 | Kim |
| 2016/0289883 A1 | 10/2016 | Lv et al. |
| 2017/0233934 A1 | 8/2017 | Lee |
| 2018/0347099 A1 | 12/2018 | Zhang et al. |
| 2019/0368110 A1 | 12/2019 | Wang et al. |
| 2021/0172108 A1 | 6/2021 | Choi et al. |

FOREIGN PATENT DOCUMENTS

| | | |
|---|---|---|
| CN | 207699869 U | 8/2018 |
| KR | 20-1988-0007576 U | 10/1986 |
| KR | 20-1989-0000833 U | 3/1987 |
| KR | 20-1987-0004869 U | 4/1987 |
| KR | 20-1987-0004870 U | 4/1987 |
| KR | 20-1987-0006417 U | 5/1987 |
| KR | 20-1988-0000383 U | 2/1988 |
| KR | 10-1988-0005905 A | 7/1988 |
| KR | 20-1988-0019765 U | 11/1988 |
| KR | 20-1988-0021944 U | 12/1988 |
| KR | 10-1989-0000429 B1 | 3/1989 |
| KR | 20-1989-0000015 Y1 | 3/1989 |
| KR | 20-1989-0001140 Y1 | 3/1989 |
| KR | 20-1989-0001684 Y1 | 4/1989 |
| KR | 20-1989-0004411 U | 4/1989 |
| KR | 20-1989-0004961 U | 4/1989 |
| KR | 20-1989-0006954 U | 5/1989 |
| KR | 20-1989-0008440 U | 5/1989 |
| KR | 20-1989-0008906 U | 5/1989 |
| KR | 20-1989-0004037 Y1 | 6/1989 |
| KR | 20-1989-0005375 Y1 | 8/1989 |
| KR | 20-1989-0013382 U | 8/1989 |
| KR | 20-1989-0007318 Y1 | 10/1989 |
| KR | 20-1989-0007596 Y1 | 10/1989 |
| KR | 20-1989-0019304 U | 10/1989 |
| KR | 20-1989-0008086 Y1 | 11/1989 |
| KR | 20-1989-0008362 Y1 | 11/1989 |
| KR | 20-1989-0023032 U | 12/1989 |
| KR | 20-1989-0023033 U | 12/1989 |
| KR | 20-1989-0023036 U | 12/1989 |
| KR | 20-1990-0000300 U | 1/1990 |
| KR | 20-1990-0002917 Y1 | 4/1990 |
| KR | 20-1990-0004286 Y1 | 5/1990 |
| KR | 20-1990-0004287 Y1 | 5/1990 |
| KR | 20-1990-0008445 U | 5/1990 |
| KR | 20-1990-0008447 U | 5/1990 |
| KR | 20-1990-0008449 U | 5/1990 |
| KR | 20-1990-0006109 Y1 | 7/1990 |
| KR | 20-1990-0007598 Y1 | 8/1990 |
| KR | 20-1990-0007600 Y1 | 8/1990 |
| KR | 20-1990-0018784 U | 11/1990 |
| KR | 20-1991-0000276 U | 1/1991 |
| KR | 20-1991-0000791 U | 1/1991 |
| KR | 20-1991-0000792 U | 1/1991 |
| KR | 20-1991-0004377 U | 3/1991 |
| KR | 20-1991-0006871 U | 5/1991 |
| KR | 20-1991-0006872 U | 5/1991 |
| KR | 20-1991-0007290 U | 5/1991 |
| KR | 20-1991-0000277 U | 10/1991 |
| KR | 20-1991-0000789 U | 10/1991 |
| KR | 10-1992-0000121 B1 | 1/1992 |
| KR | 20-1992-0007949 U | 5/1992 |
| KR | 10-1992-0012625 A | 7/1992 |
| KR | 20-1993-0008873 U | 5/1993 |
| KR | 20-1993-0019846 U | 9/1993 |
| KR | 10-1994-0009563 B1 | 5/1994 |
| KR | 20-1994-0015975 U | 7/1994 |
| KR | 10-1994-0009562 B1 | 10/1994 |
| KR | 20-1995-0005340 Y1 | 7/1995 |
| KR | 10-1995-0012727 B1 | 10/1995 |
| KR | 10-1995-0032820 A | 12/1995 |
| KR | 20-1997-0023629 U | 6/1997 |
| KR | 10-1997-0043526 A | 7/1997 |
| KR | 10-0137597 B1 | 6/1998 |
| KR | 20-0127647 Y1 | 7/1998 |
| KR | 10-0140667 B1 | 8/1998 |
| KR | 20-1998-0026613 U | 8/1998 |
| KR | 20-0132860 Y1 | 9/1998 |
| KR | 20-0134751 Y1 | 10/1998 |
| KR | 20-01141138 Y1 | 12/1998 |
| KR | 20-1999-0005942 U | 2/1999 |
| KR | 10-0176873 B1 | 5/1999 |
| KR | 10-0192240 B1 | 6/1999 |
| KR | 10-2001-0010607 A | 2/2001 |
| KR | 10-0279772 B1 | 2/2001 |
| KR | 10-2001-0049028 A | 6/2001 |
| KR | 10-2004-0046993 A | 6/2004 |
| KR | 10-0434284 B1 | 6/2004 |
| KR | 10-0434285 B1 | 6/2004 |
| KR | 10-0479095 B1 | 3/2005 |
| KR | 10-0730939 B1 | 6/2007 |
| KR | 10-0781247 B1 | 11/2007 |
| KR | 10-2012-0044570 A | 5/2012 |
| KR | 10-1343712 B1 | 12/2013 |
| KR | 10-2014-0145751 A | 12/2014 |
| KR | 10-2015-0057726 A | 5/2015 |
| KR | 10-2016-0087823 A | 7/2016 |
| KR | 10-2017-0096314 A | 8/2017 |
| KR | 10-2018-0045041 A | 5/2018 |
| KR | 10-2018-0074493 A | 7/2018 |
| KR | 10-2020-0017953 A | 2/2020 |
| KR | 10-2020-0018541 A | 2/2020 |
| KR | 10-2232389 B1 | 3/2021 |
| KR | 10-2021-0071559 A | 6/2021 |

DETERGENT SUPPLY DEVICE FOR CLOTHES PROCESSING APPARATUS

CROSS-REFERENCE TO RELATED APPLICATIONS

This application is a Bypass Continuation of International Application No. PCT/KR2022/013485, filed Sep. 7, 2022, which claims priority to Korean Patent Application No. 10-2021-0143678, filed Oct. 26, 2021, the disclosures of which are herein incorporated by reference in their entirety.

BACKGROUND

1. Field

The disclosure relates to a clothes treating apparatus, and more particularly, to a detergent supply device applicable to a clothes treating apparatus.

2. Description of Related Art

In general, clothes treating apparatuses are concepts that include apparatuses for washing clothes, apparatuses for drying clothes, and apparatuses that are able to perform both washing and drying of clothes.

In the case of washing clothes, a clothes treating apparatus typically uses a driving force of a motor to agitate laundry, washing water, and detergent in a tub together to achieve laundering through mutual friction.

A detergent supply device of a clothes treating apparatus is a device that enables detergent to be evenly mixed with the supplied water in the process of supplying water into a tub. Alternatively, a detergent supply device of a clothes treating apparatus is a device that supplies liquid detergent directly into the tub.

In recent years, to use liquid detergents such as rinsing agent and bleach, washing machines have been equipped with a liquid detergent supply device that creates a detergent inlet space for the liquid detergent in a detergent container, and a separate detergent pump is mounted to introduce the detergent into the tub.

SUMMARY

The present disclosure is directed to a detergent supply device of a clothes treating apparatus having an improved structure to prevent leakage of detergent due to the influence of assembly between components for sealing a valve.

Further, the present disclosure is directed to a detergent supply device of a clothes treating apparatus having an improved structure to reduce deformation of a sealing member of a valve caused by detergent.

According to an embodiment of the disclosure, a detergent supply device of a clothes treating apparatus includes a detergent container, a detergent pump module including a detergent pump and configured to communicate with a valve opening, a valve body configured to communicate with the detergent container at one end thereof, a plunger configured to move within the valve body, an opening and closing member provided on the plunger to open or close the valve opening in response to a movement of the plunger, and a sealing member including an outer circumferential sealing portion covering an outer circumferential surface of the valve body, an opening sealing portion extending from the outer circumferential sealing portion to cover at least a portion of an end of the valve body and forming the valve opening, and a sub-sealing portion provided integrally with the valve opening at an end of the opening sealing portion and contacting the opening and closing member when the valve opening is closed.

The opening sealing portion may include a guide portion extending to bend inwardly of the valve body and configured to guide the movement of the plunger.

The sub-sealing portion may be disposed at an end of the guide portion.

The sub-sealing portion may be formed in a ring shape along a surface on the end of the opening sealing portion facing the opening and closing member.

The outer circumferential sealing portion may be formed integrally with the opening sealing portion.

The sub-sealing portion may include a protrusion protruding from the end of the opening sealing portion.

The opening and closing member may include an inclined surface facing the end of the opening sealing portion, and the protrusion of the sub-sealing portion may be configured to contact the inclined surface of the opening and closing member when the valve opening is closed.

The inclined surface of the opening and closing member may be formed such that a width of the opening and closing member becomes narrower toward a radial direction of the plunger.

The protrusion of the sub-sealing portion may be located in the radial direction of the plunger from a portion of the end of the opening sealing portion that contacts the opening and closing member other than the protrusion.

The protrusion of the sub-sealing portion may be arranged to be in edge contact with the opening and closing member.

The detergent pump module may further include a valve coupling portion configured to receive the valve body, and the sealing member may seal a gap between an outer surface of the valve body and the valve coupling portion.

An outer surface of the valve body may contact an inner surface of the outer circumferential sealing portion to support an inner side of the sealing member.

An outer surface of the valve body may contact an inner surface of the opening sealing portion to support an inner side of the sealing member.

The valve body may include a cylindrical portion formed in a cylindrical shape with a hollow, and an outer circumferential surface of the cylindrical portion may be in contact with the inner surface of the outer circumferential sealing portion.

An anti-separation portion configured to secure the sealing member may be formed on an outer surface of the valve body.

According to another embodiment of the disclosure, a detergent supply device of a clothes treating apparatus includes a detergent container, a detergent pump module including a detergent pump configured to generate pressure for a flow of detergent, and a valve including: a valve body having one end in communication with the detergent container, another end provided with a valve opening in communication with the detergent pump module, and a flow path formed therein through which detergent flows, a plunger configured to be move within the valve body, an opening and closing member provided on the plunger and configured to open or close the valve opening in response to a movement of the plunger, and a seal member configured to cover an outer circumferential surface of the valve body and at least a portion of the valve body on a side of the valve opening, and including a sub-sealing portion at one end of the sealing member that contacts the opening and closing member when the valve opening is closed.

The sub-sealing portion may include a protrusion protruding to contact the opening and closing member when the valve opening is closed.

The sealing member may extend from a portion covering the valve opening to bend inwardly of the valve body.

The valve body may be configured to support the sealing member by being in close contact with an inner side of the sealing member.

According to still another embodiment of the disclosure, a detergent supply device of a clothes treating apparatus includes a detergent container, a detergent pump module including a detergent pump and a valve coupling portion, and a valve coupled to the valve coupling portion so as to connect the detergent container and the detergent pump module, wherein the valve includes a valve body configured to communicate with the detergent container, a plunger configured to move forwardly and backwardly within the valve body, a sealing member configured to seal a gap between the valve and the valve coupling portion and including an outer circumferential sealing portion covering an outer circumferential surface of the valve body, an opening sealing portion forming a valve opening at one end of the detergent pump module of the valve body, and a sub-sealing portion provided integrally with the opening sealing portion at an end of the opening sealing portion, and an opening and closing member coupled to the plunger and configured to selectively open or close the valve opening in response to a movement of the plunger and contacting the sub-sealing portion when the valve opening is closed.

According to aspects of the present disclosure, the valve of the detergent supply device of the clothes treating apparatus includes the sealing member provided with the sub-sealing portion integrated with the opening sealing portion, thereby preventing leakage of detergent when the detergent container is removed from the detergent supply device.

According to aspects of the present disclosure, the valve of the detergent supply device of the clothes treating apparatus has the valve body capable of supporting the inner side of the sealing member, thereby preventing the sealing member from being deformed by detergent.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
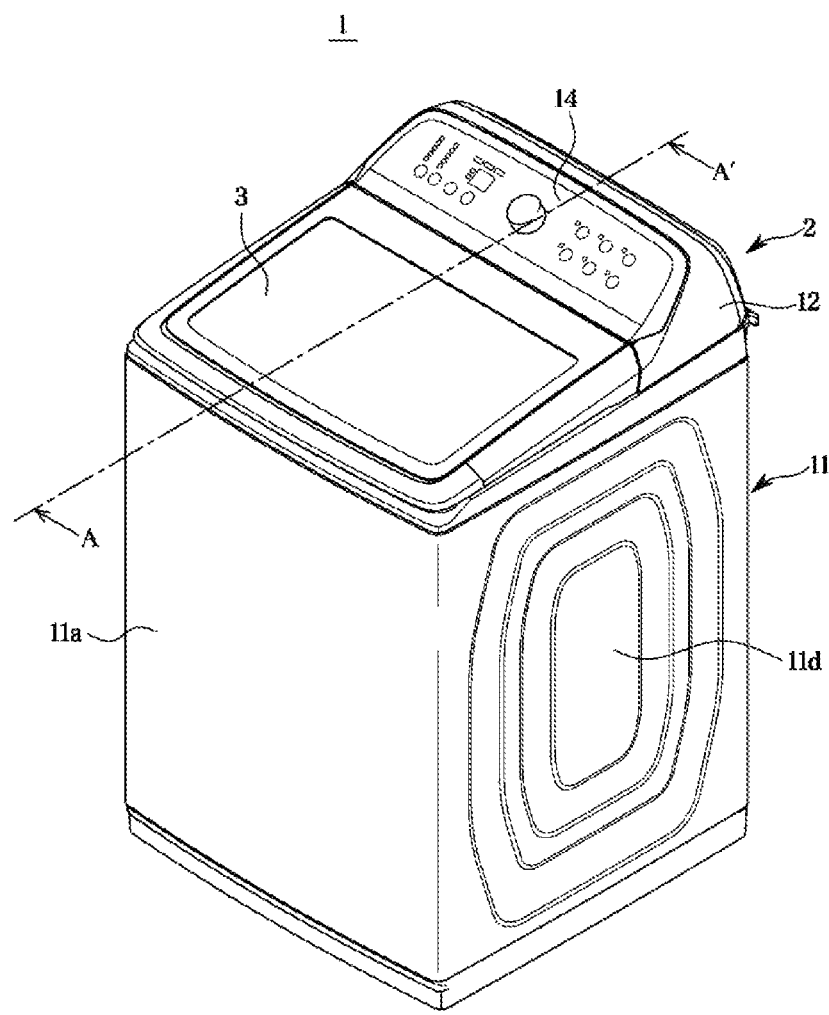
FIG. 1 is a perspective view showing a clothes treating apparatus according to an embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure and may be used in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, figures, steps, operations, elements, components, or combinations thereof, but do not preclude the presence or addition of one or more of the features, figures, steps, operations, elements, components, or combinations thereof.

It will be understood that, although the terms "first", "second", "primary", "secondary", etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

As used herein, the terms "front", "rear", "upper", "lower", "left", "right", and the like are defined with reference to the drawings and are not intended to limit the shape and location of each component. For example, a direction in which a front plate of a clothes treating apparatus according to an embodiment of the present disclosure shown in FIG. 1 faces will be described as "front" and a direction in which a rear plate not shown in FIG. 1 faces will be described as "rear".

Hereinafter, various embodiments according to the disclosure will be described in detail with reference to the accompanying drawings.

Furthermore, while the following description uses a top-loading washing machine, which is a type of a clothes treating apparatus, as an example for ease of description, the present disclosure is not limited to top-loading washing machines. For example, the configurations of the present disclosure may be applied to a front-loading washing machine. Furthermore, the present disclosure is applicable to any household appliance having a detergent supply device.

Figure 2:
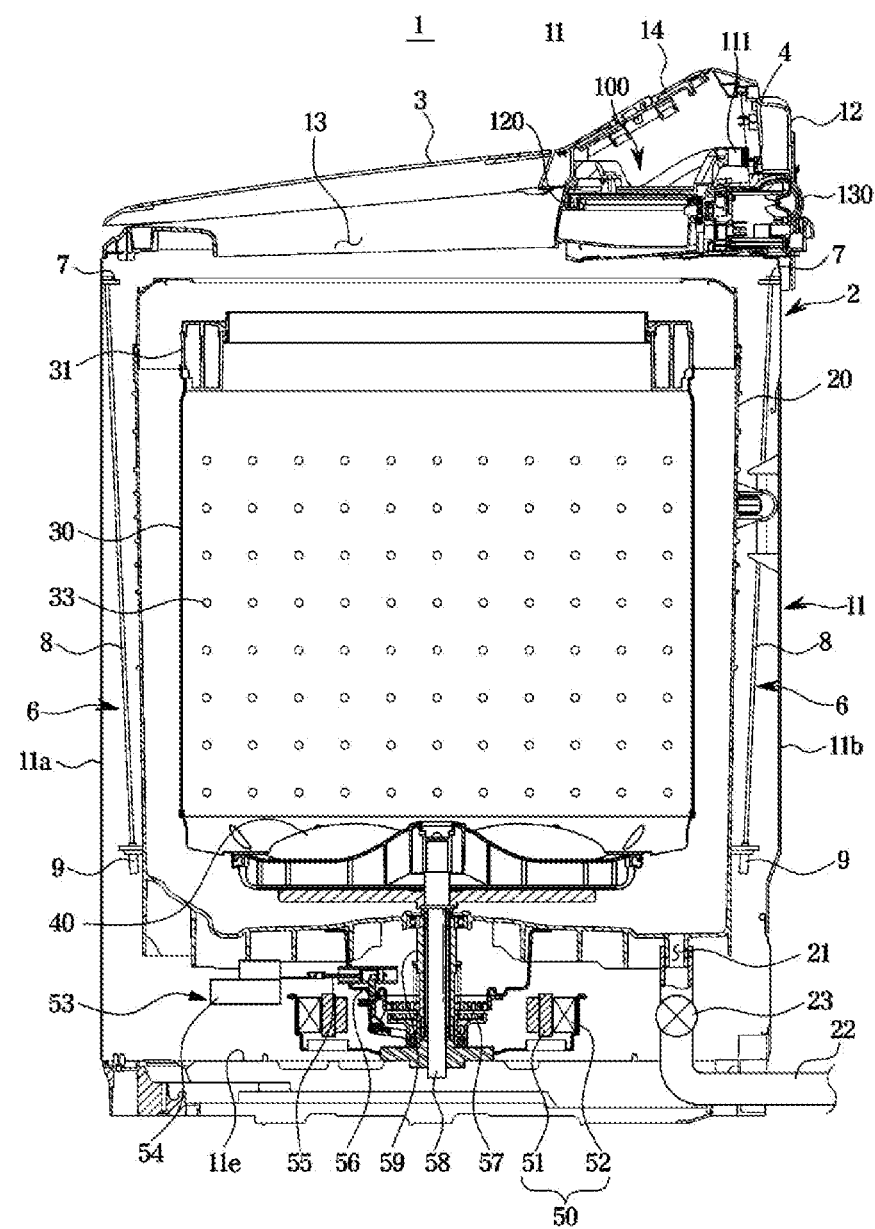
FIG. 2 is a cross-sectional view of the clothes treating apparatus of FIG. 1 taken along line A-A'.

FIG. 1 is a perspective view showing a clothes treating apparatus according to an embodiment of the present disclosure. FIG. 2 is a cross-sectional view of the clothes treating apparatus of FIG. 1 taken along line A-A'.

Referring to FIGS. 1 and 2, a clothes treating apparatus 1 may include a main body 2, a tub 20 disposed inside the main body 2 and storing washing water, and a rotating tub 30 rotatably disposed within the tub 20 and accommodating laundry, and a pulsator 40 rotatably disposed within the rotating tub 30 and generating a water current for washing.

The main body 2 may include a cabinet 11 and a top cover 12 coupled to an upper portion of the cabinet 11. The top cover 12 may be provided with an inlet 13 through which laundry may be placed in the rotating tub 30, and the inlet 13 may be opened or closed by a door 3. The top cover 12 may be provided with a control panel 14 for displaying operational information of the clothes treating apparatus 1 or receiving operational commands.

The cabinet 11 may have a box shape. That is, the cabinet 11 may have a front plate 11a, a rear plate 11b, a left plate (not shown), a right plate 11d, and a bottom plate 11e.

The tub 20 may be provided in a cylindrical shape with an open top and may store washing water. The tub 20 may be suspended from the cabinet 11 by suspension devices 6. The suspension devices 6 may be provided at four corners of the cabinet 11.

The suspension devices 6 may each include a suspension bar 8 extending vertically, a suspension cap 7 provided such that an upper end of the suspension bar 8 is coupled to the cabinet 11 and a lower end of the suspension bar 8 is coupled to the tub 20, and a spring 9 provided at the lower end of the suspension bar 8 to reduce vibration of the tub 20. The spring 9 may reduce the vibration of the tub 20 in a vertical direction.

A drain 21 may be formed in a lower portion of the tub 20 to drain the washing water stored in the tub 20 to the outside of the tub 20. A drain hose 22 may be connected to the drain 21, and a drain valve 23 may be provided on the drain hose 22 to open and close the drain hose 22.

The rotating tub 30 may be rotatably provided within the tub 20 and may accommodate laundry. The rotating tub 30 may be formed in a cylindrical shape with an open top. A plurality of holes 33 may be formed on a side surface of the rotating tub 30 to allow washing water to flow in and out. A balancing device 31 may be installed at an upper portion of the rotating tub 30 to eliminate a load imbalance caused by laundry. The balancing device 31 may include a housing having an annular channel and a ball or fluid mass movably provided within the channel. As the balls or fluid moves in accordance with the rotation of the rotating tub 30, the load imbalance may be resolved.

The pulsator 40 may be rotatably provided at the lower portion of the rotating tub 30 to generate a flow of washing water. Laundry may be washed by a flow of washing water generated by the pulsator 40.

The clothes treating apparatus 1 may include a detergent supply device 100 that supplies detergent. The detergent supply device 100 may include a water supply pipe 111 connected to an external water supply source. Washing water supplied through the water supply pipe 111 may be provided to pass through a detergent supply device, so that detergent may be supplied to the tub 20 together with washing water. The detergent supply device 100 will be described later.

The clothes treating apparatus 1 may include a drive device for rotating the rotating tub 30 and the pulsator 40.

The drive device may include a motor 50 that converts an electrical force into a mechanical rotational force, and a shaft system that transmits a driving force of the motor 50 to the pulsator 40 and the rotating tub 30.

The motor 50 may include a fixed stator 51 and a rotor 52 that interacts electromagnetically with the stator 51 to rotate.

The shaft system may include a spin-drying shaft 59 provided to transmit the driving force of the motor 50 to the rotating tub 30, a washing shaft 58 provided to transmit the driving force of the motor 50 to the pulsator 40, and a clutch device 53 that connects or disconnects the motor 50 and the spin-drying shaft 59.

The spin-drying shaft 59 may have a hollow, and the washing shaft 58 may be provided in the hollow of the spin-drying shaft 59. The washing shaft 58 may remain connected to the rotor 52 of the motor 50, and the spin-drying shaft 59 may be connected to or disconnected from the rotor 52 of the motor 50 by the clutch device 53.

When the clutch device 53 disconnects the spin-drying shaft 59 from the motor 50, power may be transmitted only to the washing shaft 58 to allow only the pulsator 40 to rotate, and when the clutch device 53 connects the spin-drying shaft 59 to the motor 50, power may be transmitted to both the spin-drying shaft 59 and the washing shaft 58 to allow the rotating tub 30 and the pulsator 40 to rotate simultaneously.

When only the pulsator 40 rotates, the washing water flow may be generated by the rotation of the pulsator 40, and the laundry may be rotated by the generated washing water flow and rubbed against the rotating tub 30, thereby performing washing of the laundry. When the pulsator 40 and the rotating tub 30 rotate together, the laundry may rotate in the rotating tub 30, and moisture is removed from the laundry by a centrifugal force, thereby performing spin-drying of the laundry.

The clutch device 53 may include an actuator 54 that generates a driving force for power conversion, a rod 55 that is moved linearly by an action of the actuator 54, a lever 56 that is pivotally connected to the rod 55, and a coupling 57 coupled to the spin-drying shaft 59 to be move vertically in accordance with an operation of the lever 56. When the coupling 57 is lowered, the coupling 57 may be connected to the rotor 52 so that the driving force of the motor 50 may be transmitted to the spin-drying shaft 59, and when the coupling 57 is raised, the coupling 57 may be disconnected from the rotor 52 so that the driving force of the motor 50 may be not transmitted to the spin-drying shaft 59.

Figure 3:
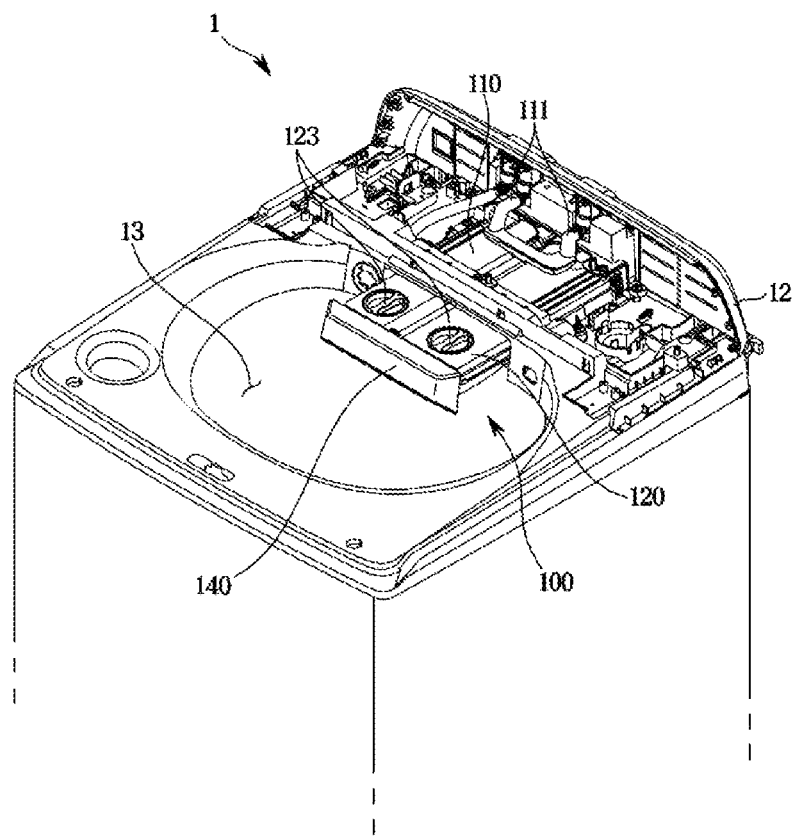
FIG. 3 is a view showing a detergent container that has been pulled forward from the clothes treating apparatus of FIG. 1.
Figure 4:
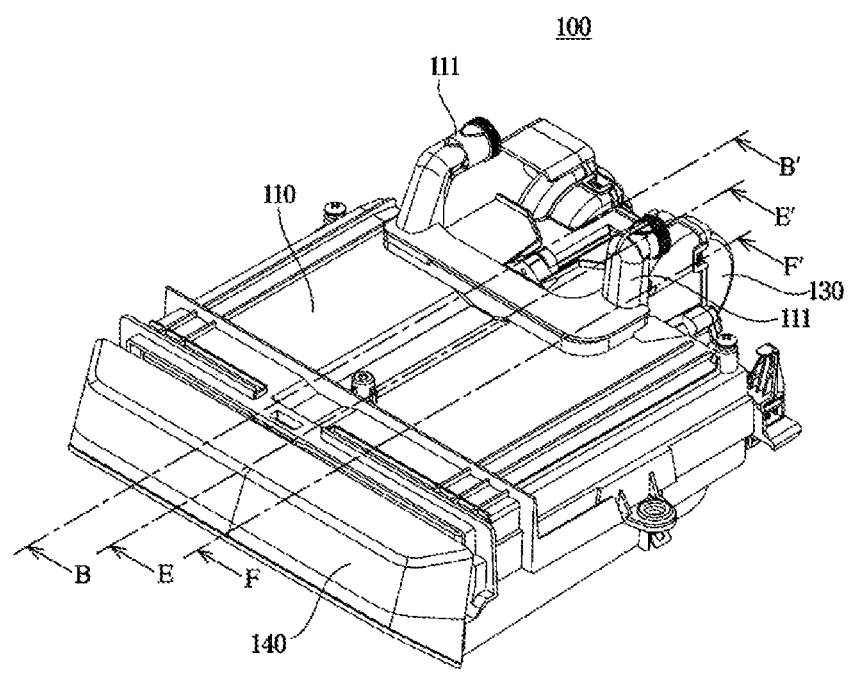
FIG. 4 is a perspective view showing a detergent supply device of the clothes treating apparatus according to an embodiment of the present disclosure.
Figure 5:
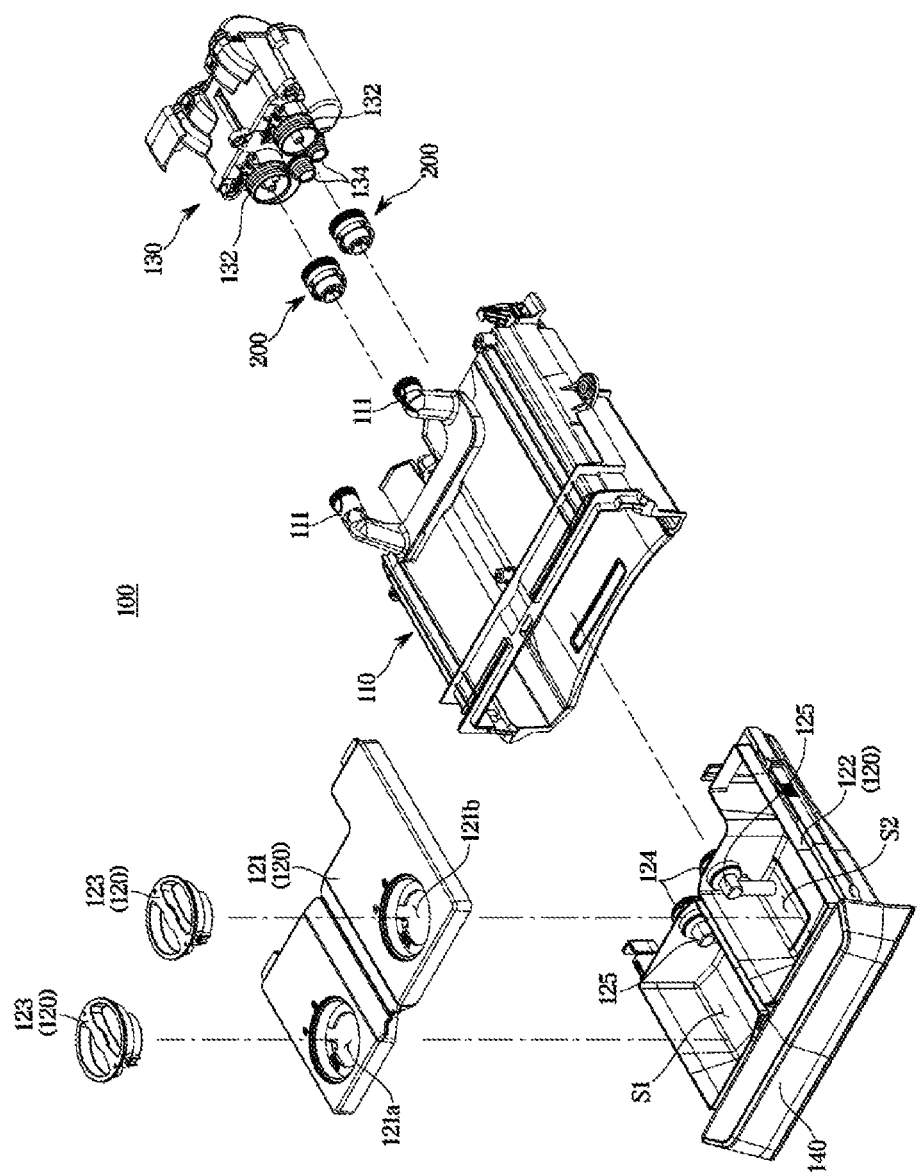
FIG. 5 is an exploded perspective view of the detergent supply device of FIG. 4.
Figure 6:
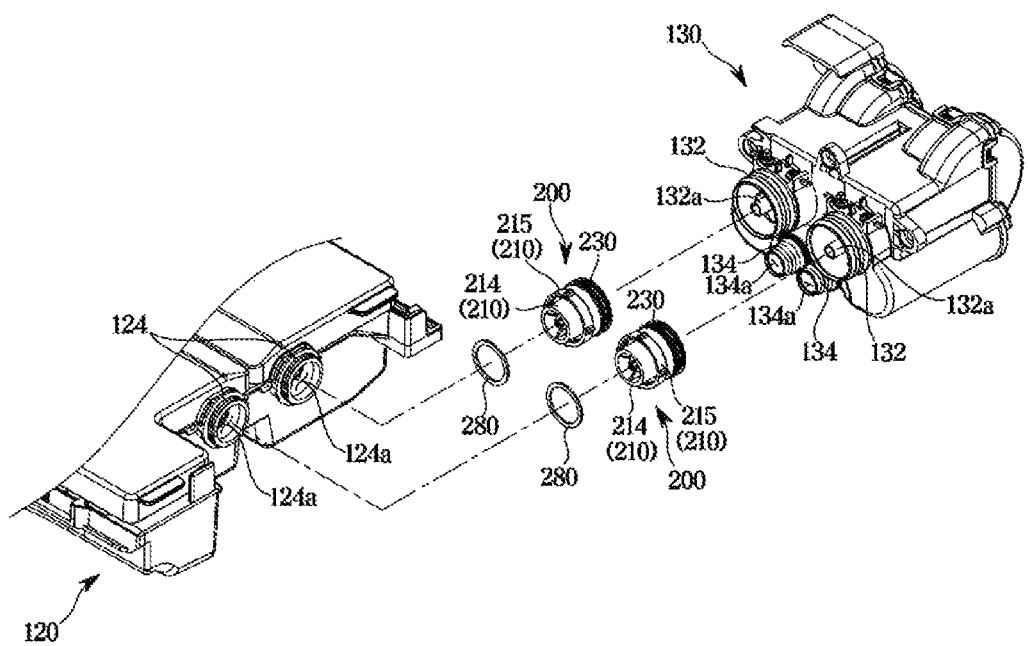
FIG. 6 is a view showing a coupling relationship between the detergent container, a valve, and a detergent pump module in the detergent supply device of FIG. 4.
Figure 7:
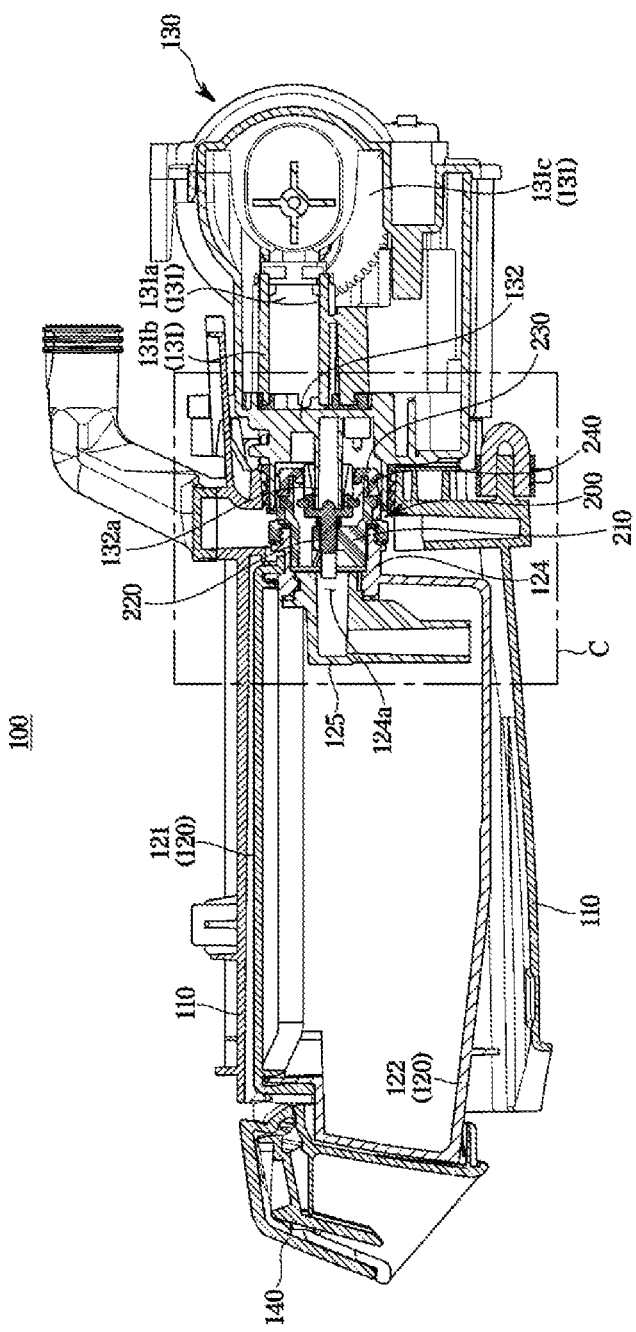
FIG. 7 is a cross-sectional view of the detergent supply device of FIG. 4 taken along line B-B'.
Figure 8:
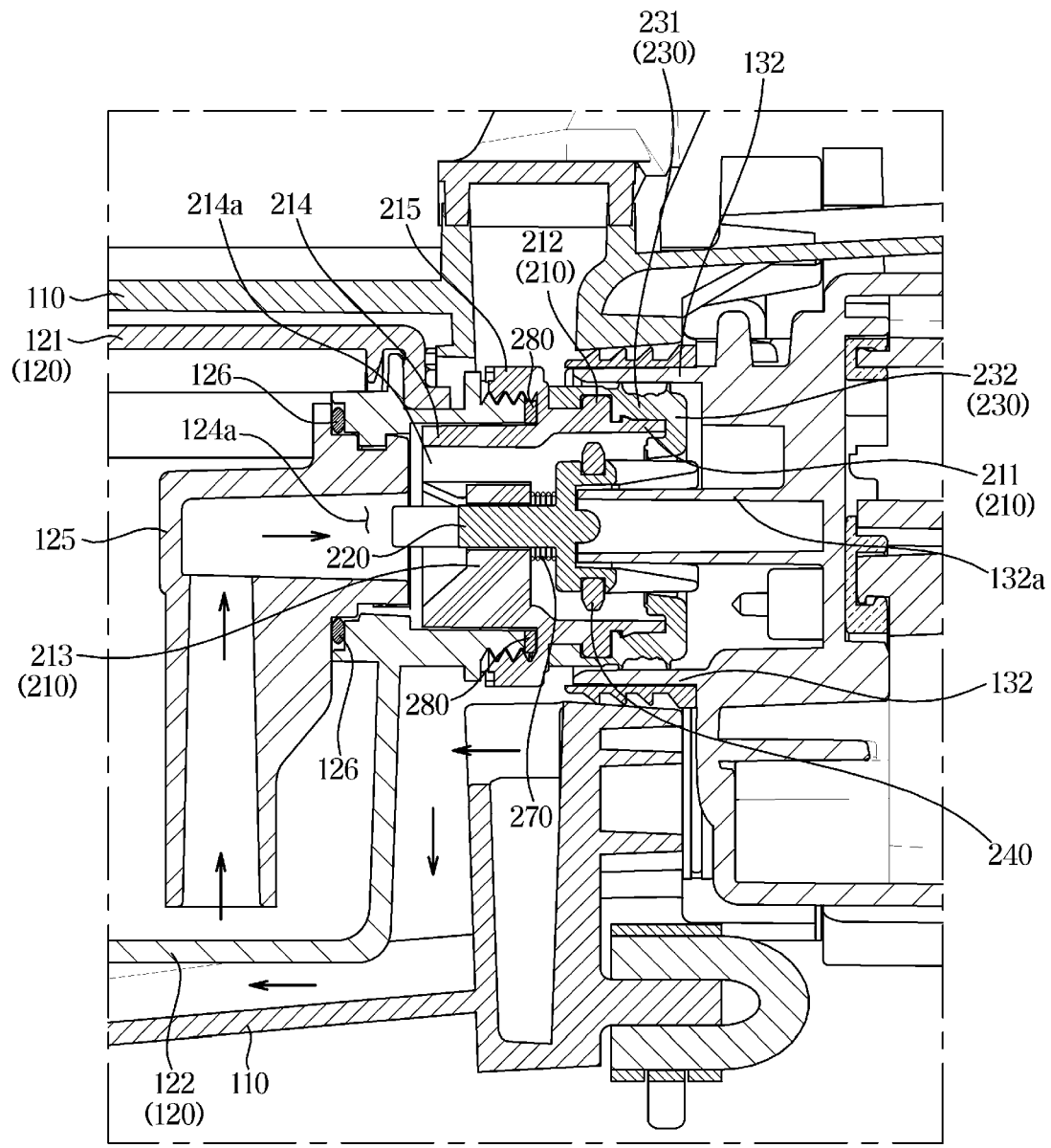
FIG. 8 is an enlarged view of C shown in FIG. 7.

FIG. 3 is a view showing a detergent container that has been pulled forward from the clothes treating apparatus of FIG. 1. FIG. 4 is a perspective view showing the detergent supply device of the clothes treating apparatus according to an embodiment of the present disclosure. FIG. 5 is an exploded perspective view of the detergent supply device of FIG. 4. FIG. 6 is a view showing a coupling relationship between the detergent container, a valve, and a detergent pump module in the detergent supply device of FIG. 4. FIG. 7 is a cross-sectional view of the detergent supply device of FIG. 4 taken along line B-B'. FIG. 8 is an enlarged view of C in FIG. 7.

Referring to FIGS. 3 to 8, the detergent supply device 100 according to an embodiment of the present disclosure may be coupled to the top cover 12 and connected to the water supply pipe 111 to be supplied with washing water from an external water source. In particular, the detergent supply device 100 may include a housing 110 coupled to the top cover 12, and the water supply pipe 111 coupled to the housing 110 to supply washing water into the interior of the housing 110. The water supply pipe 111 may include a water supply valve to control the supply of washing water. The water supply pipe 111 may be provided in a plurality such that at least one thereof may be supplied with cold water and at least another thereof may be supplied with hot water.

The detergent supply device 100 may include a detergent container 120 that forms detergent receiving spaces S1 and S2 that may contain detergent or fabric softener. The detergent container 120 may be disposed within the housing 110. The detergent container 120 may be disposed within the housing 110 so as to be separable from the housing 110.

The detergent container 120 may be disposed within the interior of the housing 110 and spaced apart from a lower surface of the housing 110. The lower surface of the housing 110 may be inclined downwardly in a forward direction.

Accordingly, the washing water supplied through the water supply pipe 111 and the detergent supplied from an outlet portion 134 of a detergent pump module 130 may be moved along the lower surface of the housing 110 toward a front side of the housing 110 to be supplied into the tub. However, the present disclosure is not limited thereto, and detergent or washing water in the housing 110 may be supplied into the tub 20 in a variety of ways. For example, a drain hose (not shown) communicating with the interior of the housing 110 may be provided to supply detergent or washing water to the tub 20.

The detergent container 120 may be provided such that the detergent container 120 may be accessible from the front. In particular, the detergent container 120 may be pulled forwardly out of the housing attached to the top cover 12 and pulled into the housing 110. Accordingly, when required, a user may easily pull out the detergent container 120 and add detergent or fabric softener to the detergent receiving spaces S1 and S2 through detergent inlets 121a and 121b. However, the present disclosure is not limited thereto, and the detergent container 120 may be formed in various structures that allow the user to add detergent, or the like into the detergent receiving spaces S1 and S2.

The detergent supply device 100 may further include a handle 140 in front of the detergent container 120. Accordingly, the detergent container 120 may be more easily pulled forward from the housing 110 by the user.

When the detergent container 120 is pulled forward from the housing 110, a valve 200 coupled to a detergent supply portion 124 of the detergent container 120 may be released from a valve coupling portion 132. As the valve 200 is released from the valve coupling portion 132, a plunger 220 of the valve 200 may be moved to a rear side of the detergent supply device 100 by a restoring force of a spring 270 and a valve opening 250 may be closed by an opening and closing member 240. As a result, the detergent in the detergent container 120 and the valve 200 may not leak to the outside. A detailed operation of the valve 200 will be described later.

When the detergent container 120 is pulled to a rear side thereof, the valve 200 may be coupled to the valve coupling portion 132 of the detergent pump module 130 to connect the detergent container 120 and the detergent pump module 130. As the valve 200 is coupled to the valve coupling portion 132, the plunger 220 of the valve 200 may be moved to a front side of the detergent supply device 100 and the valve opening 250 may be opened by the opening and closing member 240. As a result, the detergent in the detergent receiving spaces S1 and S2 may be moved to the detergent pump module 130 through the detergent supply portion 124 and the valve 200. The detailed operation of the valve 200 will be described later.

The detergent container 120 may include a detergent container body 122 forming the detergent receiving spaces S1 and S2 therein, and a detergent container cover 121 covering the detergent receiving spaces S1 and S2. The detergent container cover 121 may be coupled to an upper portion of the detergent container body 122 to cover the detergent receiving spaces S1 and S2.

The detergent container cover 121 may be detachably coupled to the detergent container body 122. Accordingly, the user may easily clean the detergent container 120 by separating the detergent container cover 121 from the detergent container body 122.

The detergent container body 122 may have the detergent receiving spaces S1 and S2 formed therein to receive detergent. In particular, the detergent receiving spaces S1 and S2 may be formed in a plurality, and the detergent container body 122 may be formed such that the plurality of detergent receiving spaces S1 and S2 are partitioned from each other. At least one of the plurality of detergent receiving spaces S1 and S2 may contain detergent, and at least different one thereof may contain fabric softener. As a result, the user may supply both detergent and fabric softener into the inside of the tub 20 through one detergent supply device 100, and the detergent and fabric softener may be accommodated without mixing with each other. However, the present disclosure is not limited thereto, and the detergent receiving spaces S1 and S2 may contain only detergent or only fabric softener. In addition, in contrast to FIG. 5, three or more detergent receiving spaces (not shown) may be formed inside the detergent container body 122.

The detergent container body 122 may be provided with the detergent supply portion 124 for supplying detergent from the detergent receiving spaces S1 and S2 to the valve 200 side. In particular, one end of the detergent supply portion 124 may communicate with the detergent receiving spaces S1 and S2, and the other end thereof may include a detergent supply port 124a into which detergent is discharged. The detergent supply portion 124 may be coupled to container coupling portions 214 and 215 of the valve 200 at the other end where the detergent supply ports 124a are formed. As a result, the valve 200 may be in communication with the detergent container 120.

The detergent supply portion 124 may be formed in a plurality corresponding to the detergent receiving spaces S1 and S2, and the valves 200 may be formed in a plurality corresponding to the detergent receiving spaces S1 and S2. However, the present disclosure is not limited thereto, and the detergent supply portion 124 and the valve 200 may be formed in a single.

The detergent supply portion 124 may be provided on a rear side of the detergent container 120. In particular, the detergent supply portion 124 may be disposed on a rear side of the detergent container body 122 and may be provided to penetrate the rear side of the detergent container body 122. The valve 200 may be coupled to the detergent supply portion 124 at the rear side of the detergent container body 122 and may connect the detergent container 120 and the detergent pump module 130. However, the present disclosure is not limited thereto, and the detergent supply portion 124 may be provided in various structures as long as it is coupled to the detergent container 120 to allow the detergent receiving spaces S1 and S2 and the valve 200 to communicate. For example, the detergent supply portion 124 may penetrate the detergent container 120 toward a lateral side of the detergent container body 122 or an upper side of the detergent container cover 121.

A detergent supply duct 125 formed to communicate with the detergent supply portion 124 may be provided inside the detergent container body 122. The detergent supply duct 125 may be formed such that one end thereof is coupled to the detergent supply portion 124 to communicate with the detergent supply port 124a and the other end thereof is communicated with the detergent receiving spaces S1 and S2. In particular, the detergent supply duct 125 may be formed such that the other end communicating with the detergent receiving spaces S1 and S2 faces a lower surface of the detergent container body 122. As a result, although a height of the detergent contained in the detergent receiving spaces S1 and S2 is lower than a height of the detergent supply portion 124, the detergent may be moved to the detergent supply portion 124 side via the detergent supply duct 125.

The detergent supply duct 125 and the detergent supply portion 124 may be manufactured and assembled separately. In this case, the side where the detergent supply duct 125 and the detergent supply portion 124 are coupled may be provided with a separate sealing member 126 to seal a gap between the detergent supply duct 125 and the detergent supply portion 124, thereby preventing detergent from leaking. However, the present disclosure is not limited thereto, and the detergent supply duct 125 and the detergent supply portion 124 may be formed integrally.

The handle 140 described above may be provided on a front side of the detergent container body 122. Accordingly, the user may easily enter and exit the detergent container 120 by using the handle 140. However, the present disclosure is not limited thereto, and the handle 140 may be provided in various positions. For example, the handle 140 may be provided on a front side of the detergent container cover 121.

The detergent inlets 121a and 121b for adding detergent may be formed in the detergent container cover 121. The user may add detergent, fabric softener, or the like to the detergent receiving spaces S1 and S2 via the detergent inlets 121a and 121b. In particular, the detergent inlets 121a and 121b may be formed in a plurality to correspond to a plurality of detergent receiving spaces S1 and S2. Accordingly, the user may separate detergent, fabric softener, or the like through the plurality of detergent inlets 121a and 121b and add the separated one to the detergent receiving spaces S1 and S2. However, the present disclosure is not limited thereto, and when the detergent receiving spaces are formed in a single unit within the detergent container body 122, the detergent inlets may also be formed in a corresponding single unit.

The detergent container 120 may include a cap 123 for opening or closing the detergent inlets 121a and 121b. In particular, the cap 123 may be detachably coupled to the detergent container cover 121 at an upper portion of the detergent container cover 121 to open or close the detergent inlets 121a and 121b.

The cap 123 may be provided in a plurality corresponding to the plurality of detergent inlets 121a and 121b. Accordingly, the plurality of caps 123 may open or close the plurality of detergent inlets 121a and 121b, respectively, and open or close the plurality of detergent receiving spaces S1 and S2, respectively. However, the present disclosure is not limited thereto, and when the detergent inlets 121a and 121b are formed in a single unit, the cap 123 may also be provided in a corresponding single unit.

The detergent supply device 100 may include the detergent pump module 130 including a detergent pump 131. The detergent pump module 130 may be connected to the detergent container 120 by the valve 200 and may be in communication with the detergent receiving spaces S1 and S2.

The detergent pump 131 may include a motor (not shown) that provides power to a gear 131c, the gear 131c that translates a piston 131a, the piston 131a that regulates hydraulic pressure within the detergent pump 131, and a piston cylinder 131b. In particular, the rotational movement of the gear 131c may be converted into a translational movement of the piston 131a connected to the gear 131c, and the piston cylinder 131b may guide the movement of the piston 131a. The piston 131a may move within the piston cylinder 131b to regulate the hydraulic pressure within the detergent pump module 130. When the piston 131a moves forward of the detergent pump module 130, the volume within the detergent pump module 130 may decrease, which may increase the hydraulic pressure. Conversely, when the piston 131a moves backward of the detergent pump module 130, the volume within the detergent pump module 130 may increase, which may decrease the hydraulic pressure. Accordingly, the hydraulic pressure inside the detergent pump module 130 may be adjusted, and a flow of detergent through an inlet portion 133 and an outlet portion 134, which will be described later, may be adjusted.

The detergent pump module 130 may include the valve coupling portion 132 to which the valve 200 is coupled. The valve coupling portion 132 may be formed to allow the valve 200 to be coupled therein. In particular, the valve coupling portion 132 may be formed such that a valve body 210 is inserted from one side of the detergent pump module 130. In other words, the valve body 210 may be inserted into the valve coupling portion 132 and coupled to the detergent pump module 130. However, the present disclosure is not limited thereto, and the valve body 210 may be coupled to the valve coupling portion 132 in a variety of ways.

When the valve body 210 is inserted into the valve coupling portion 132, a gap may be formed between an outer surface of the valve body 210 and the valve coupling portion 132. In this case, the detergent discharged through the valve opening 250 may leak through the gap between the valve body 210 and the valve coupling portion 132. To prevent such a situation, the valve 200 may include a sealing member 230 arranged to seal the gap between the outer surface of the valve body 210 and the valve coupling portion 132. The detailed structure and function of the sealing member 230 will be described later.

The valve 200 may be detachably coupled to the valve coupling portion 132. The valve coupling portion 132 may include a pressing portion 132a that presses the plunger 220 disposed within the valve body 210 depending on whether the valve 200 is coupled. The pressing portion 132a may press the plunger 220 against the front side of the detergent supply device 100 when the valve 200 is coupled to the valve coupling portion 132. This may cause the plunger 220 to move forward of the detergent supply device 100, and in turn, the opening and closing member 240 provided on the plunger 220 may also move with the plunger 220, thereby opening the valve opening 250. As a result, the valve opening 250 and the detergent pump module 130 may communicate, and the detergent in the detergent container 120 and the valve 200 may move into the detergent pump module 130. The detailed structure and function of the plunger 220 will be described later.

The valve coupling portion 132 may be formed in a plurality corresponding to the number of valves 200. However, the present disclosure is not limited thereto, and the valve coupling portion 132 may be formed as a singular number.

The pressing portion 132a may be disposed inside the valve coupling portion 132 and may be formed in a cylindrical shape. However, the present disclosure is not limited thereto, and the pressing portion 132a may be formed in a variety of ways to press the plunger 220.

The inlet portion 133 provided such that the detergent pump module 130 communicates with the valve opening 250 may be formed within the valve coupling portion 132. The inlet portion 133 may selectively open or close an inlet 133a formed to receive the detergent discharged from the valve opening 250. The inlet 133a may be selectively opened and closed in response to an operation of the detergent pump 131. As a result, the detergent pump module 130 may be in communication with the valve opening 250 to allow the detergent that has passed through the valve 200, to be introduced into the detergent pump module 130. The detailed structure and function of the inlet portion 133 will be described later.

The detergent pump module 130 may be formed with the outlet portion 134 provided to discharge the detergent within the detergent pump module 130 into the housing 110. The outlet portion 134 may selectively open or close an outlet 134a formed to discharge the detergent introduced into the detergent pump module 130 through the inlet portion 133. The outlet 134a may be selectively opened and closed in response to the operation of the detergent pump 131. The outlet portion 134 may be disposed within the housing 110, and the outlet 134a may be formed such that the detergent pump module 130 is in communication with the interior of the housing 110. As a result, when the outlet 134a is opened, the detergent in the detergent pump module 130 may be discharged into the housing 110 and the detergent may be mixed with the washing water in the housing 110 to be supplied to the tub 20. However, the present disclosure is not limited thereto, and the outlet portion 134 may be formed in a variety of ways as long as it has a structure capable of supplying detergent to the interior of the tub 20. For example, the outlet portion 134 may supply detergent directly to the tub 20 without being in communication with the interior of the housing 110. The detailed structure and function of the outlet portion 134 will be described later.

The detergent supply device 100 may include the valve 200 provided to connect the detergent container 120 and the detergent pump module 130. Detergent, fabric softener, or the like contained in the detergent receiving spaces S1 and S2 inside the detergent container 120 may be moved to the detergent pump module 130 through the valve 200.

More specifically, the valve 200 may include a first container coupling portion 214 to be coupled to the detergent container 120. The first container coupling portion 214 may be formed on the valve body 210 and may be coupled to the detergent supply portion 124 of the detergent container 120.

A detergent inlet 214a may be formed in the first container coupling portion 214 in communication with the detergent supply port 124a to allow detergent to enter the interior of the valve body 210. Accordingly, the valve body 210 may be in communication with the detergent container 120. In other words, the valve body 210 may be in communication with the detergent receiving spaces S1 and S2.

The first container coupling portion 214 may pass through the detergent supply port 124a to be coupled to the interior of the detergent supply portion 124. However, the present disclosure is not limited thereto, and the first container coupling portion 214 may be coupled to the detergent supply portion 124 in a variety of ways. For example, the first container coupling portion 214 may be coupled to cover an outer surface of the detergent supply portion 124.

The valve 200 may include the second container coupling portion 215 to be coupled to the detergent container 120. The second container coupling portion 215 may be formed on the valve body 210, and may be coupled to the detergent supply portion 124. More specifically, the second container coupling portion 215 may cover the outer surface of the detergent supply portion 124, and may be coupled to the detergent supply portion 124. However, the present disclosure is not limited thereto, and the second container coupling portion 215 may be coupled to the detergent supply portion 124 in a variety of ways.

The first container coupling portion 214 and the second container coupling portion 215 may form a container seating groove 216 (see FIG. 9) therebetween so that the detergent supply portion 124 may be inserted and coupled. As a result, the first container coupling portion 214 may be coupled to the inside of the detergent supply portion 124, and the second container coupling portion 215 may be coupled to the outside of the detergent supply portion 124, so that the valve 200 may be reliably coupled to the detergent supply portion 124. However, the present disclosure is not limited thereto, and the valve 200 may be coupled to the detergent container 120 in a variety of ways.

When the detergent supply portion 124 is inserted into the container seating groove 216 to couple the detergent supply portion 124 to the valve body 210, the container seating groove 216 may be provided with a separate sealing member 280. The separate sealing member 280 may be disposed between one end of the detergent supply portion 124 and one surface of the container seating groove 216 side of the valve body 210 to which the detergent supply portion 124 is coupled. As a result, the detergent discharged from the detergent supply portion 124 may not leak to the outside.

The valve 200 may be detachably coupled to the detergent supply portion 124 by the first container coupling portion 214 and the second container coupling portion 215.

Figure 9:
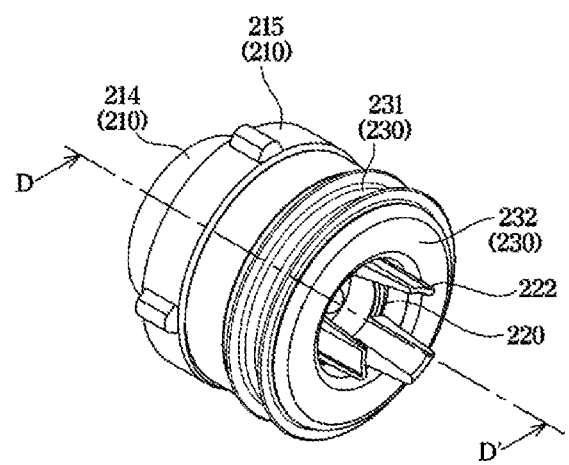
FIG. 9 is a perspective view showing the valve of FIG. 4.
Figure 10:
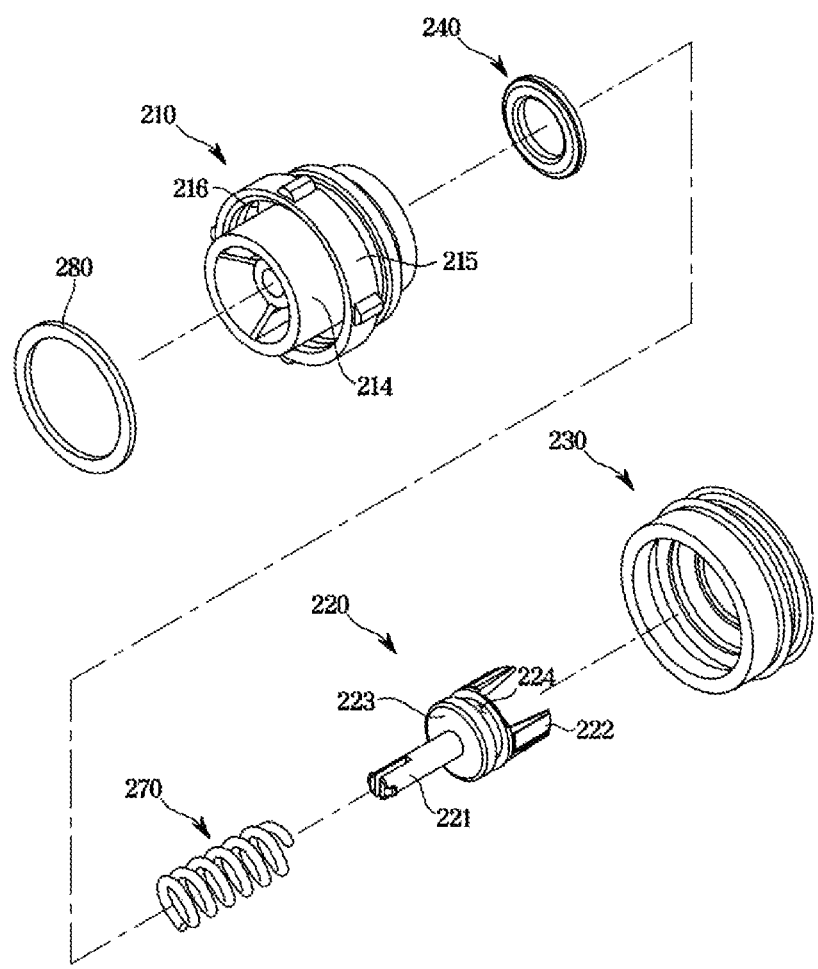
FIG. 10 is an exploded perspective view of the valve of FIG. 9.
Figure 11:
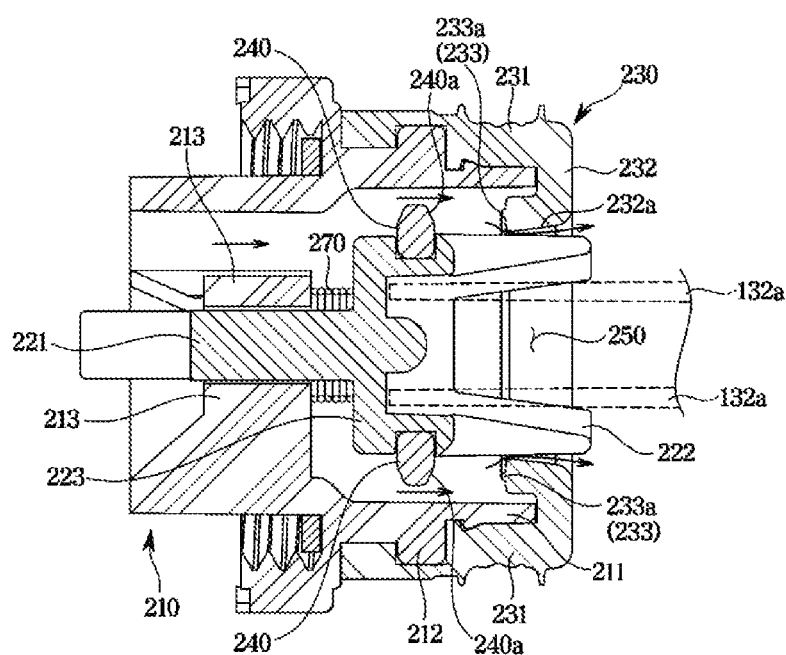
FIG. 11 is a cross-sectional view showing a valve opening of FIG. 9 opened, taken along line D-D'.
Figure 12:
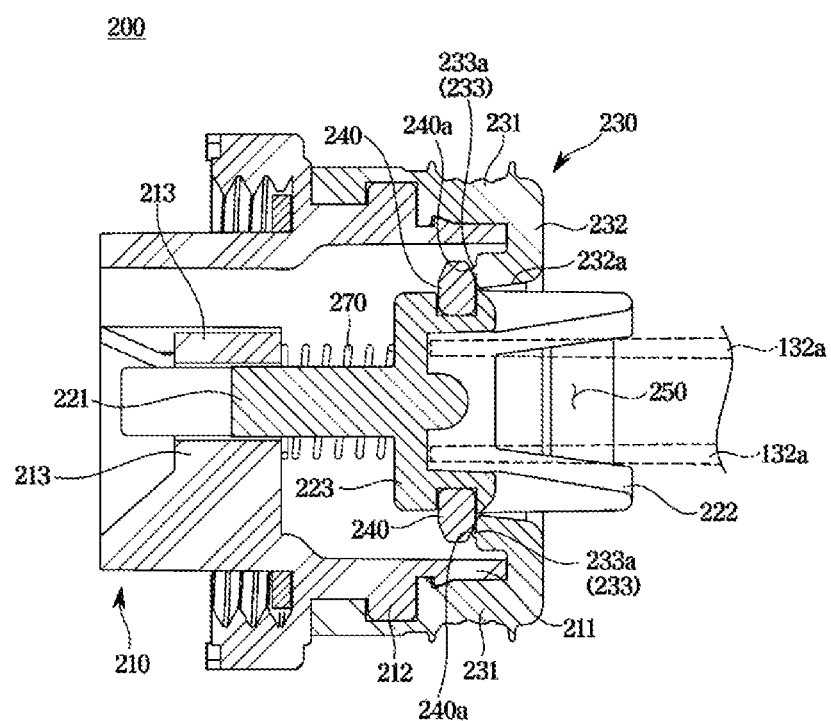
FIG. 12 is a cross-sectional view showing the valve opening of FIG. 9 closed, taken along line D-D'.

FIG. 9 is a perspective view showing the valve of FIG. 4. FIG. 10 is an exploded perspective view of the valve of FIG. 9. FIG. 11 is a cross-sectional view showing the opened valve opening of FIG. 9 taken along line D-D'. FIG. 12 is a cross-sectional view showing the closed valve opening of FIG. 9 taken along line D-D'.

The valve 200 may include the valve body 210, the plunger 220, the opening and closing member 240, and the sealing member 230. The valve 200 may regulate the flow of detergent depending on whether the valve 200 is coupled to the detergent pump module 130.

The valve body 210 may be formed such that one end thereof communicates with the detergent container 120. As described above, the valve body 210 may be coupled to the detergent supply portion 124 of the detergent container 120 by means of the container coupling portions 214 and 215. The first container coupling portion 214 including the detergent inlet 214a may communicate with the detergent container 120.

The valve opening 250 may be provided at the other end of the valve body 210 opposite to the end communicating with the detergent container 120. In particular, as will be described later, the valve opening 250 may be formed by an opening sealing portion 232 at the other end side of the valve body 210. As a result, a flow path through which the detergent moves may be formed within the valve body 210.

The valve body 210 may include a plunger support portion 213 for supporting the plunger 220, which will be described later. In particular, the plunger support portion 213 may be formed within the valve body 210 to support the plunger 220.

The plunger support portion 213 may have include the shape of a hollow cylinder. The plunger 220 may be supported by the hollow of the plunger support portion 213 and may be movably supported along the hollow. In particular, a first slider 221 of the plunger 220 may be inserted into the hollow of the plunger support portion 213 to support the plunger 220. However, the present disclosure is not limited thereto, and the plunger support portion 213 may be formed in a variety of ways as long as the plunger 220 may be movably supported thereto.

The sealing member 230, which will be described later, may be provided on the outside of the valve body 210. The outer surface of the valve body 210 may contact an inner surface of the sealing member 230 to support an inner side of the sealing member 230. In other words, the valve body 210 may support the sealing member 230 by being in close contact with an inward side of the sealing member 230. In particular, the outer surface of the valve body 210 may contact an inner surface of an outer circumferential sealing portion 231. In addition, the outer surface of the valve body 210 may contact an inner surface of the opening sealing portion 232. As a result, the sealing member 230 may be supported by the valve body 210 even when deformed by detergent.

The valve body 210 may include a cylindrical portion 211 formed in a hollow cylindrical shape. The plunger 220 may be disposed within the cylindrical portion 211, wherein detergent may travel.

The outer circumferential sealing portion 231, which will be described later, may be provided on the outside of the cylindrical portion 211. In particular, an outer circumferential surface of the cylindrical portion 211 may contact an outer surface of the outer circumferential sealing portion 231 to support the outer circumferential sealing portion 231. As a result, the outer circumferential sealing portion 231 may be supported by the cylindrical portion 211 even when deformed by detergent.

One end of the valve body 210 may contact the inner surface of the opening sealing portion 232, which will be described later. As a result, the opening sealing portion 232 may be supported by the one end of the valve body 210 even when deformed by detergent.

The one end of the valve body 210 that contacts the inner surface of the opening sealing portion 232 may be one end of the cylindrical portion 211.

The valve body 210 may include an anti-separation portion 212 to allow the sealing member 230 to be secured to the valve body 210. In particular, the anti-separation portion 212 may be formed on the outer surface of the valve body 210 that contacts the inner surface of the sealing member 230.

The anti-separation portion 212 may contact an inner surface of the outer circumferential sealing portion 231. However, the present disclosure is not limited thereto, and the anti-separation portion 212 may contact a different portion of the sealing member 230 to secure the sealing member 230.

The anti-separation portion 212 may have a flange shape. Correspondingly, the sealing member 230 may have a shape corresponding to the flange shape of the anti-separation portion 212. However, the present disclosure is not limited thereto, and the anti-separation portion 212 may be formed in a variety of shapes to secure the sealing member 230. For example, the anti-separation portion 212 may have a hook shape to secure the sealing member 230.

The valve body 210 may be injection-molded from a plastic material. However, the present disclosure is not limited thereto, and the valve body 210 may be configured to include a variety of materials.

The plunger 220 may be movably disposed with the valve body 210.

The opening and closing member 240, which will be described later, may be provided on the plunger 220 to open or close the valve opening 250 in response to the movement of the plunger 220.

The plunger 220 may be movably provided by the pressing portion 132a of the detergent pump module 130 described above. In particular, when the valve 200 is coupled to the valve coupling portion 132, the pressing portion 132a may press the plunger 220 against the front of the detergent supply device 100 side, and the plunger 220 may be moved to the front side of the detergent supply device 100. As a result, the valve opening 250 may open, and detergent may move through the valve 200 to the detergent pump module 130 side.

The plunger 220 may be provided with the spring 270 at one end. When the valve 200 is separated from the valve coupling portion 132, the pressing portion 132a does not press the plunger 220, so that the plunger 220 may be moved to the rear side of the detergent supply device 100 by the restoring force of the spring 270. As a result, the valve opening 250 may be closed, and the flow path of the detergent may be blocked.

The spring 270 may be disposed along an outer surface of the first slider 221, which will be described later, and may be arranged between an intermediate plate 223 and the plunger support portion 213.

The plunger 220 may include the first slider 221 arranged to be supported by the valve body 210, the intermediate plate 223 coupled to the first slider 221, and a second slider 222 extending from the intermediate plate 223 toward the valve opening 250.

The first slider 221 may be supported by the plunger support portion 213. In particular, the first slider 221 may be movably supported by being inserted into the hollow of the plunger support portion 213.

The first slider 221 may have the shape of a bar. The cross-section of the first slider 221 may be circular. However, the present disclosure is not limited thereto, and the first slider 221 may have a variety of shapes that allow the first slider 221 to move efficiently while being supported by the plunger support portion 213.

The diameter of the first slider 221 may be smaller than the diameter of the intermediate plate 223. This may reduce the volume occupied by the first slider 221 within the valve body 210, thereby reducing the resistance of the first slider 221 to the detergent travelling within the valve body 210. In addition, the spring 270 provided on the outer surface of the first slider 221 may be efficiently compressed by the intermediate plate 223. In addition, the restoring force of the spring 270 may be efficiently transmitted to the intermediate plate 223 to move the plunger 220. However, the present disclosure is not limited thereto, and the first slider 221 may have different dimensions.

The intermediate plate 223 may be arranged to be coupled to one end of the valve opening 250 side of the first slider 221.

When the valve 200 is coupled to the valve coupling portion 132, the intermediate plate 223 may be pressed against the front side of the detergent supply device 100 by the pressing portion 132a. The intermediate plate 223 may press the spring 270 when pressed by the pressing portion 132a.

When the valve 200 is released from the valve coupling portion 132, the pressing portion 132a may be released from the intermediate plate 223, and the pressed spring 270 may be pushed by the restoring force to move the intermediate plate 223 toward the valve opening 250 side.

The intermediate plate 223 may be formed in a disc shape. However, the present disclosure is not limited thereto, and the intermediate plate 223 may have a variety of shapes that allow the plunger 220 to be movably arranged by an external force.

The second slider 222 may extend from the intermediate plate 223 toward the valve opening 250. The second slider 222 may pass through the valve opening 250 when the valve opening 250 is closed by the opening and closing member 240. In this case, the second slider 222 may have a diameter smaller than the diameter of the valve opening 250. However, the present disclosure is not limited thereto, and the second slider 222 may have a variety of shapes. For example, the second slider 222 may be formed so as not to penetrate the valve opening 250 when the valve opening 250 is closed.

The second slider 222 may be formed in a shape of a cylinder when the intermediate plate 223 is formed to have the shape of a disc. However, the shape of the second slider 222 is not limited thereto and may be formed in a variety of ways.

An opening and closing member seating groove 224 may be provided between the intermediate plate 223 and the second slider 222 so that the opening and closing member 240 may be seated. In particular, the opening and closing member seating groove 224 may be formed along an outer circumferential surface of the plunger 220 between the intermediate plate 223 and the second slider 222. As a result, the opening and closing member 240 may be reliably coupled to the plunger 220, so that the valve opening 250 may be opened or closed in response to the movement of the plunger 220. However, the present disclosure is not limited thereto, and the opening and closing member seating groove 224 may be disposed in a variety of positions. Furthermore, without the opening and closing member seating groove 224, the opening and closing member 240 may be provided on the plunger 220 in a variety of ways.

The valve 200 may include the opening and closing member 240 that is disposed within the valve 200 and opens or closes the valve opening 250 in response to the movement of the plunger 220.

The opening and closing member 240 may be disposed on the plunger 220 to selectively open or close the valve opening 250 in response to the movement of the plunger 220. In particular, the opening and closing member 240 may be provided on the outer circumferential surface of the plunger 220. Furthermore, the opening and closing member 240 may be coupled to the opening and closing member seating groove 224 provided between the intermediate plate 223 and the second slider 222, as described above. However, the present disclosure is not limited thereto, and the opening and closing member 240 may be provided in a variety of positions as long as it may open or close the valve opening 250 in response to the movement of the plunger 220.

The opening and closing member 240 may be formed in the shape of a ring along the outer circumferential surface of the plunger 220. However, the present disclosure is not limited thereto, and the opening and closing member 240 may be formed in a variety of shapes that are capable of opening or closing the valve opening 250.

When the valve opening 250 is closed, the opening and closing member 240 may contact the sealing member 230 to block the release of the detergent.

The opening and closing member 240 may be arranged to contact an end of the opening sealing portion 232 of the sealing member 230 to close the valve opening 250. In particular, the opening and closing member 240 may be brought into contact with a sub-sealing portion 233 provided at the end of the opening sealing portion 232 to close the valve opening 250.

The opening and closing member 240 may include an inclined surface 240a facing the end of the opening sealing portion 232. The inclined surface 240a of the opening and closing member 240 may be in contact with the end of the opening sealing portion 232 when the valve opening 250 is closed. In particular, the inclined surface 240a of the opening and closing member 240 may contact the sub-sealing portion 233 when the valve opening 250 is closed.

The inclined surface 240a of the opening and closing member 240 may be formed such that a width of the opening and closing member 240 becomes narrower toward a radial direction of the plunger 220. As a result, the opening and closing member 240 may effectively seal a gap between the opening and closing member 240 and the sub-sealing portion 233 when the valve opening 250 is closed, thereby preventing detergent from leaking out.

The opening and closing member 240 may be formed of a material, such as silicon or rubber, so that when the valve opening 250 is closed, the gap between the opening and closing member 240 and the sub-sealing portion 233 may be efficiently sealed.

The valve 200 may include the sealing member 230 formed to seal the gap between the valve body 210 and the valve coupling portion 132 when the valve 200 is coupled to the valve coupling portion 132 of the detergent pump module 130.

The sealing member 230 may include an outer circumferential sealing portion 231, the opening sealing portion 232, and the sub-sealing portion 233.

The outer circumferential sealing portion 231 may cover an outer circumferential surface of the valve body 210. The outer surface of the outer circumferential sealing portion 231 may contact an inner surface of the valve coupling portion 132, and the inner surface of the outer circumferential sealing portion 231 may contact the outer surface of the valve body 210.

As described above, the inner surface of the outer circumferential sealing portion 231 may contact the outer surface of the valve body 210 to allow the sealing member 230 to be supported by the valve body 210. In particular, the inner surface of the outer circumferential sealing portion 231 may be in contact with the outer circumferential surface of the cylindrical portion 211 of the valve body 210.

As described above, the anti-separation portion 212 may be formed on the outer surface of the valve body 210 to ensure that the outer circumferential sealing portion 231 is secured to the valve body 210 and prevents it from separating. When the anti-separation portion 212 is formed in a flange shape, the inner surface of the outer circumferential sealing portion 231 may be formed with a shape corresponding to the flange shape.

The sealing member 230 may include the opening sealing portion 232 that covers at least a portion of the end of the valve body 210 and forms the valve opening 250.

The opening sealing portion 232 may be arranged to cover the end of the valve body 210 to seal between the valve body 210 and the valve coupling portion 132 when the valve body 210 is coupled to the valve coupling portion 132.

The opening sealing portion 232 may extend laterally from the outer circumferential sealing portion 231 at the end of the valve body 210. Moreover, the opening sealing portion 232 may extend inwardly of the valve body 210. As a result, the opening and closing member 240 may contact the sub-sealing portion 233 provided at the end of the opening sealing portion 232, thereby easily closing the valve opening 250. However, the present disclosure is not limited thereto, and the opening sealing portion 232 may not extend inwardly of the valve body 210.

The opening sealing portion 232 may include a guide portion 232a that guides the movement of the plunger 220. In particular, the opening sealing portion 232 may include the guide portion 232a that extends to bend inwardly of the valve body 210 to guide the movement of the plunger 220. As a result, the plunger 220 may secure a stable travel section.

As described above, the outer surface of the valve body 210 may contact the inner surface of the opening sealing portion 232 to support the inner side of the sealing member 230. In particular, the end of the valve body 210 may contact the inner surface of the opening sealing portion 232 to support the opening sealing portion 232.

Figure 17:
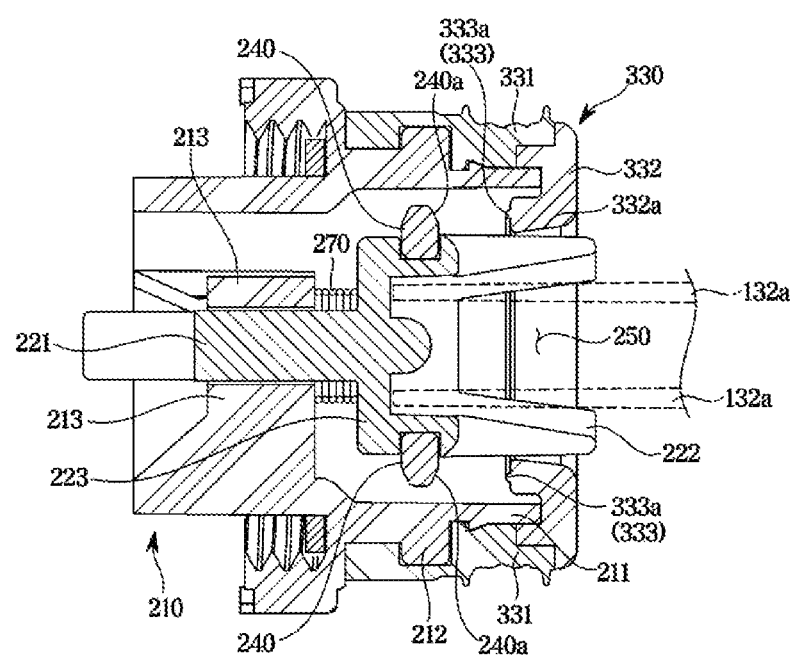
FIG. 17 is a cross-sectional view showing an open valve opening of a detergent supply device of a clothes treating apparatus according to another embodiment of the present disclosure.

The opening sealing portion 232 may be formed integrally with the outer circumferential sealing portion 231. In other words, the opening sealing portion 232 may extend integrally from the outer circumferential sealing portion 231 to cover at least a portion of the end of the valve body 210. This may reduce the risk of detergent leaking out of the valve 200 compared to the case where the opening sealing portion 232 and the outer circumferential sealing portion 231 are manufactured as separate configurations and assembled. However, the present disclosure is not limited thereto, and as shown in FIG. 17, the outer circumferential sealing portion 231 and the opening sealing portion 232 may be provided in separate configurations.

The sealing member 230 may include the sub-sealing portion 233 provided at an end of the opening sealing portion 232. The sub-sealing portion 233 may contact the opening and closing member 240 when the valve opening 250 is closed. In other words, the sub-sealing portion 233 may seal the gap between the opening and closing member 240 and the opening sealing portion 232 when the valve opening 250 is closed.

The sub-sealing portion 233 may be formed integrally with the opening sealing portion 232. Accordingly, although there is no separate configuration for sealing between the end of the opening sealing portion 232 and the opening and closing member 240, the gap between the opening and closing member 240 and the opening sealing portion 232 may be easily sealed. In the case where the outer circumferential sealing portion 231 and the opening sealing portion 232 are formed integrally, the sealing member 230 may be formed in an integral structure as a whole.

In the case where the opening sealing portion 232 includes the guide portion 232a, the sub-sealing portion 233 may be provided at an end of the guide portion 232a. As the guide portion 232a extends to bend inwardly of the valve body 210, the sub-sealing portion 233 may also be provided inwardly of the valve body 210. However, the present disclosure is not limited thereto, and the sub-sealing portion 233 may be disposed at any position of the end of the opening sealing portion 232 as long as it is in contact with the opening and closing member 240.

The sub-sealing portion 233 may be formed in the shape of a ring along a surface on the end of the opening sealing portion 232 that faces the opening and closing member 240. In particular, a protrusion 233a of the sub-sealing portion 233, which will be described later, may protrude in a ring shape along the surface on the end of the opening sealing portion 232. However, the present disclosure is not limited thereto, and the sub-sealing portion 233 may be formed only on a portion of the end of the opening sealing portion 232.

The sub-sealing portion 233 may include the protrusion 233a protruding from the end of the opening sealing portion 232. The protrusion 233a may be arranged to contact the opening and closing member 240 to seal the gap between the end of the opening sealing portion 232 and the opening and closing member 240 when the valve opening 250 is closed.

When the protrusion 233a of the sub-sealing portion 233 is in surface contact with the opening and closing member 240, detergent may be introduced from a space where the protrusion 233a and the opening and closing member 240 are in contact, and the detergent may harden over time. In this case, the hardened detergent may reduce the ability of the protrusion 233*a* of the sub-sealing portion 233 to seal the gap between the opening and closing member 240 and the opening sealing portion 232. Therefore, it is important to reduce a contact area between the protrusion 233*a* and the opening and closing member 240.

To address such a situation, the protrusion 233*a* of the sub-sealing portion 233 may be in edge contact with the opening and closing member 240. However, the present disclosure is not limited thereto, and the protrusion 233*a* may be in surface contact with the opening and closing member 240.

When the opening and closing member 240 includes the inclined surface 240*a* described above, the protrusion 233*a* of the sub-sealing portion 233 may contact the inclined surface 240*a* of the opening and closing member 240 when the valve opening 250 is closed. In particular, the inclined surface 240*a* of the opening and closing member 240 may be formed such that the width of the opening and closing member 240 becomes narrower toward the radial direction of the plunger 220. In this case, the protrusion 233*a* of the sub-sealing portion 233 may be located in the radial direction of the plunger 220 from a portion of the end of the opening sealing portion 232 that contacts the opening and closing member 240 other than the protrusion 233*a*. In other words, the protrusion 233*a* of the sub-sealing portion 233 may be provided in the radially outmost portion of the portion of the sealing member 230 that contact the opening and closing member 240 when the valve opening 250 is closed. However, the present disclosure is not limited thereto, and the protrusion 233*a* may contact the opening and closing member 240 at various locations.

The sealing member 230 may be configured to include an elastic material. Specifically, the outer circumferential sealing portion 231, the opening sealing portion 232, and the sub-sealing portion 233 may be configured to include an elastic material. This may improve the efficiency of the sealing member 230 in sealing the gap between configurations.

The sealing member 230 may be configured to include a silicone or rubber material. Specifically, the outer circumferential sealing portion 231, the opening sealing portion 232, and the sub-sealing portion 233 may each be configured to include a silicone or rubber material. The outer circumferential sealing portion 231, the opening sealing portion 232, and the sub-sealing portion 233 may include the same material. However, the present disclosure is not limited thereto, and the sealing member 230 may be configured to include a variety of materials. The outer circumferential sealing portion 231, the opening sealing portion 232, and the sub-sealing portion 233 may each include a different material.

As described above, the sealing member 230 may cover the outer circumferential surface of the valve body 210 and at least a portion of the valve body 210 on the valve opening 250 side, and may include the sub-sealing portion 233 at one end thereof. The sub-sealing portion 233 may contact the opening and closing member 240 when the valve opening 250 is closed.

In such configurations, the sub-sealing portion 233 may seal the gap between the opening and closing member 240 and the end of the opening sealing portion 232 when the valve opening 250 is closed, and may prevent detergent from leaking out of the valve 200.

Figure 13:
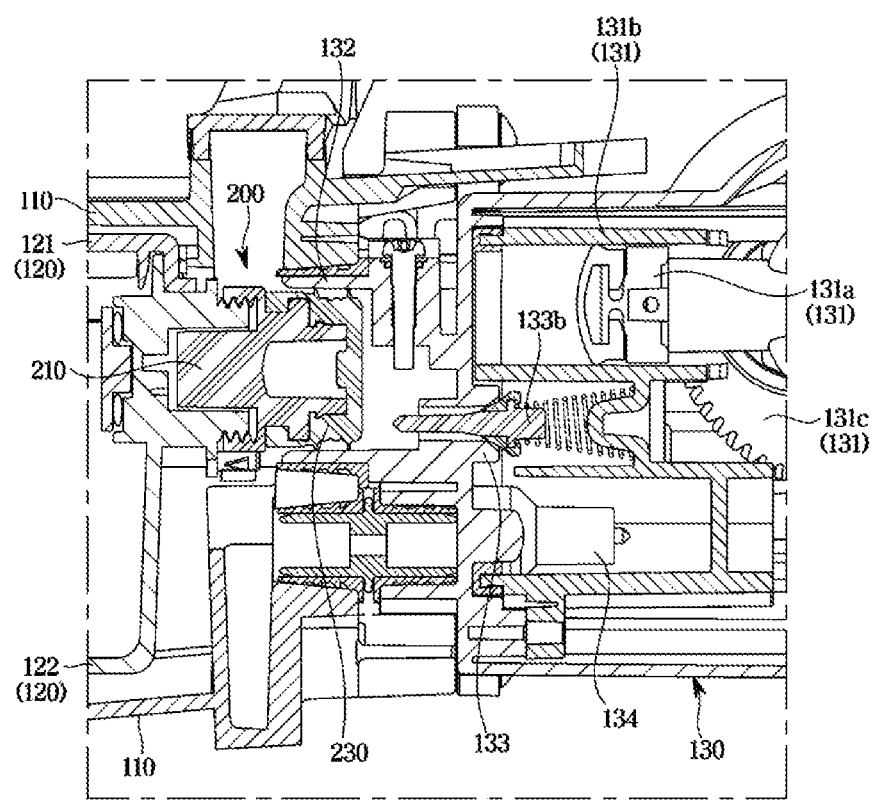
FIG. 13 is a cross-sectional view showing an inlet of FIG. 4 closed, taken along the line E-E'.
Figure 14:
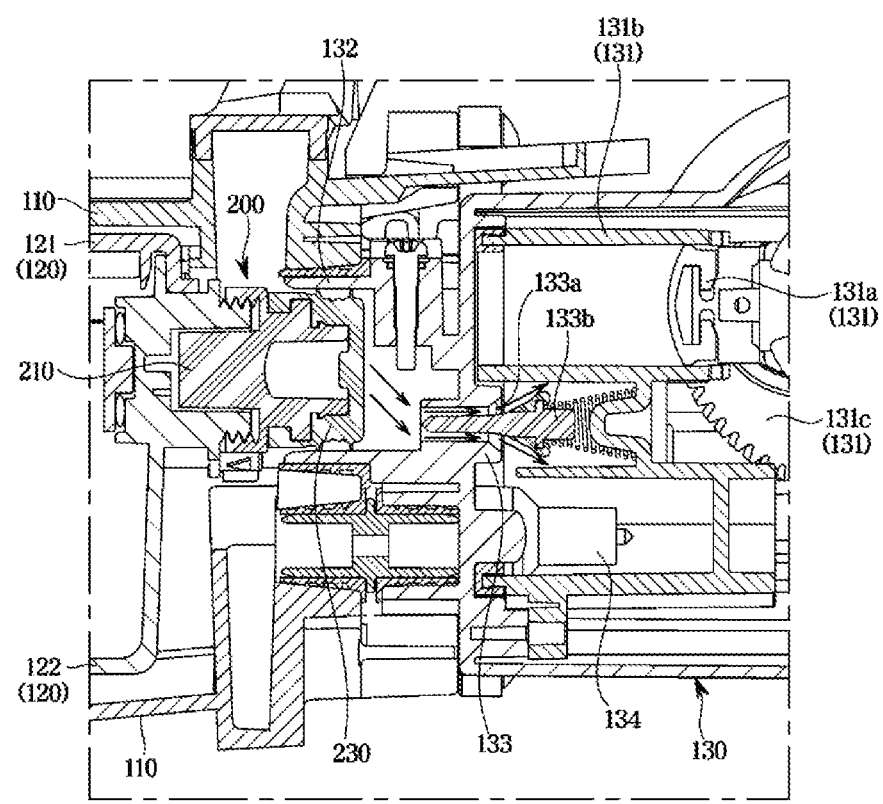
FIG. 14 is a cross-sectional view showing the inlet of FIG. 4 open, taken along the line E-E'.
Figure 15:
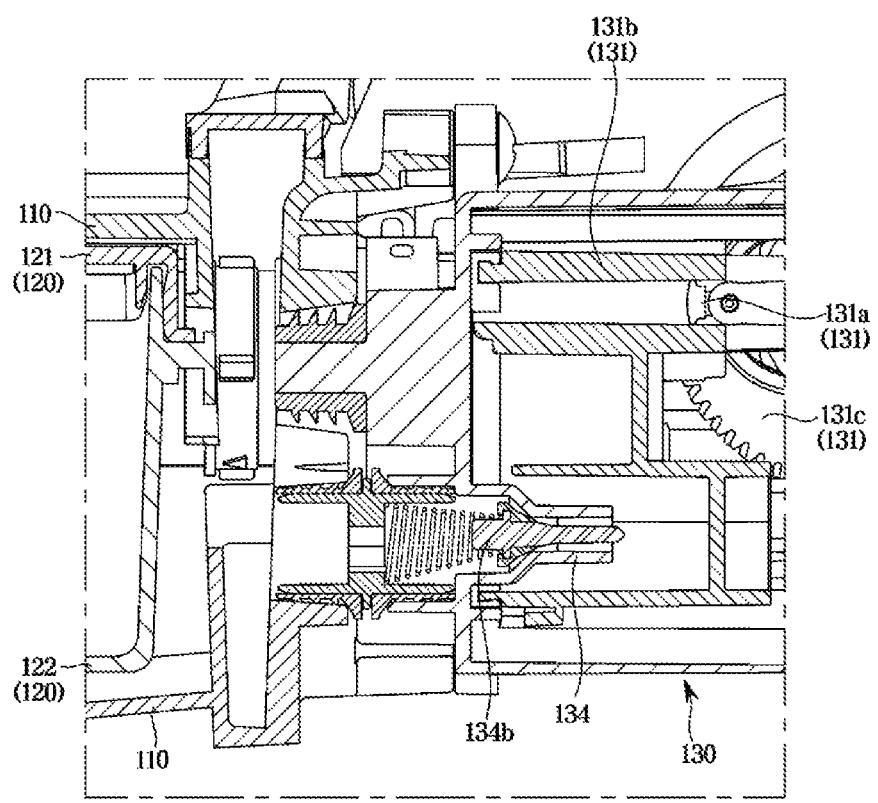
FIG. 15 is a cross-sectional view showing an outlet of FIG. 4 closed, taken along the line F-F'.
Figure 16:
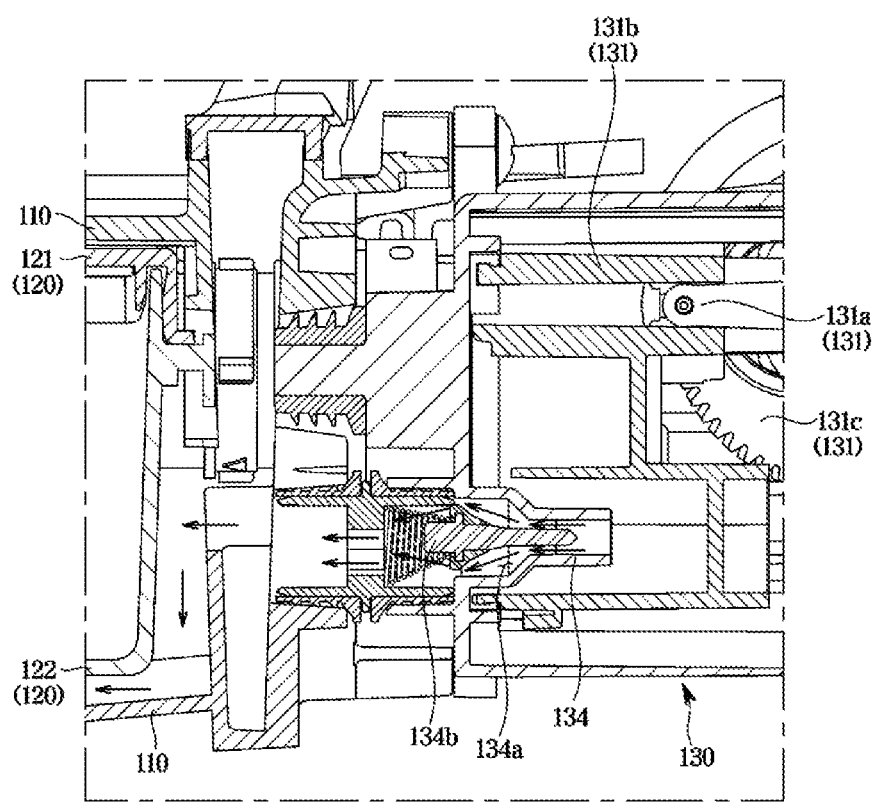
FIG. 16 is a cross-sectional view showing the outlet of FIG. 4 open, taken along the line F-F'.

FIG. 13 is a cross-sectional view showing the closed inlet of FIG. 4 taken along the line E-E'. FIG. 14 is a cross-sectional view showing the open inlet of FIG. 4 taken along the line E-E'. FIG. 15 is a cross-sectional view showing the closed outlet of FIG. 4 taken along the line F-F'. FIG. 16 is a cross-sectional view showing the open outlet of FIG. 4 taken along the line F-F'.

Referring to FIGS. 13 to 16, the inlet 133*a* through which detergent may be introduced from the valve 200 may be formed in the inlet portion 133 of the detergent pump module 130.

The inlet portion 133 may be provided with an inlet opening and closing member 133*b* that opens or closes the inlet 133*a*. In particular, the inlet opening and closing member 133*b* may open or close the inlet 133*a* from the inner side of the detergent pump module 130 and may extend through the inlet 133*a*.

A stretchable spring, which is secured to the detergent pump module 130, may be provided at one end inside the detergent pump module 130 of the inlet opening and closing member 133*b*.

As shown in FIG. 13, when the piston 131*a* of the detergent pump 131 is moved to the front side of the detergent pump module 130, the hydraulic pressure inside the detergent pump module 130 may increase. Accordingly, the increased hydraulic pressure may cause the inlet opening and closing member 133*b* to close the inlet 133*a*, preventing detergent from travelling from the valve 200 to the detergent pump module 130 side.

Conversely, as shown in FIG. 14, when the piston 131*a* of the detergent pump 131 is moved to the rear side of the detergent pump module 130, the hydraulic pressure inside the detergent pump module 130 may decrease. Accordingly, the reduced hydraulic pressure may cause the inlet opening and closing member 133*b* to open the inlet 133*a*, allowing detergent to travel from the valve 200 to the detergent pump module 130 side.

The outlet portion 134 may be provided with an outlet opening and closing member 134*b* that opens or closes the outlet 134*a*. In particular, the outlet opening and closing member 134*b* may open or close the outlet 134*a* from the outer side of the detergent pump module 130, and may extend through the outlet 134*a*.

The stretchable spring secured to the outlet portion 134 may be provided at one end outside the detergent pump module 130 of the outlet opening and closing member 134*b*.

As shown in FIG. 15, when the piston 131*a* of the detergent pump 131 is moved to the rear side of the detergent pump module 130, the hydraulic pressure inside the detergent pump module 130 may decrease. Accordingly, the reduced hydraulic pressure may cause the outlet opening and closing member 134*b* to close the outlet 134*a*, preventing detergent from travelling from the detergent pump module 130 to the housing 110 side.

As shown in FIG. 16, when the piston 131*a* of the detergent pump 131 is moved to the front side of the detergent pump module 130, the hydraulic pressure inside the detergent pump module 130 may increase. Accordingly, the increased hydraulic pressure may cause the outlet opening and closing member 134*b* to open the outlet 134*a* allowing detergent to travel from the detergent pump module 130 to the housing 110 side.

The detergent pump 131, the inlet portion 133, and the outlet portion 134 may be formed in a plurality corresponding to the number of valves 200. However, the present disclosure is not limited thereto, and the detergent pump 131, the inlet portion 133, and the outlet portion 134 may be formed as a singular number.

In such configurations, the detergent supply device 100 of the clothes treating apparatus 1 may supply detergent or fabric softener from the detergent receiving spaces S1 and S2 formed inside the detergent container 120 to the detergent pump module 130 through the valve 200. The valve 200 may include the plunger 220 and the opening and closing member 240 to selectively open or close the valve opening 250, and may include the sealing member 230 to prevent detergent from leaking out. The detergent pump module 130 may include the detergent pump 131, which may introduce or block detergent from the valve 200 through the inlet portion 133 and may discharge or block detergent from the housing 110 through the outlet portion 134. As a result, the detergent supply device 100 may supply detergent and washing water into the tub 20.

FIG. 17 is a cross-sectional view showing an open valve opening of a detergent supply device of a clothes treating apparatus according to another embodiment of the present disclosure.

With reference to FIG. 17, a sealing member according to another embodiment of the present disclosure will be described. In describing the embodiment shown in FIG. 17, the same reference numerals may be assigned to the same components as those shown in FIGS. 1 to 16 and the description thereof may be omitted.

Referring to FIG. 17, a sealing member 330 according to another embodiment of the present disclosure may include an outer circumferential sealing portion 331, an opening sealing portion 332, and a sub-sealing portion 333, wherein the outer circumferential sealing portion 331 and the opening sealing portion 332 may be provided in separate configurations.

The outer circumferential sealing portion 331 may cover the outer circumferential surface of the valve body 210. The outer surface of the valve body 210 may be arranged to contact the inner surface of the outer circumferential sealing portion 331 and support the inner side of the outer circumferential sealing portion 331.

The opening sealing portion 332 may be arranged to cover at least a portion of the end of the valve body 210 and form the valve opening 250. The opening sealing portion 332 may be formed in a separate configuration from the outer circumferential sealing portion 331 and may be arranged to extend from the outer circumferential sealing portion 331. In other words, the opening sealing portion 332 may contact one end of the outer circumferential sealing portion 331 and extend from the outer circumferential sealing portion 331 toward the end of the valve opening 250 side of the valve body 210. The opening sealing portion 332 may include a guide portion 332a that extends to bend inwardly of the valve body 210 to guide the movement of the plunger 220. The outer surface of the valve body 210 may be arranged to contact the inner surface of the outer circumferential sealing portion 331 to support the inner side of the outer circumferential sealing portion 331. The outer surface of the valve body 210 may be arranged to contact the inner surface of the opening sealing portion 332 to support the inner side of the opening sealing portion 332.

The sub-sealing portion 333 may be formed at the end of the opening sealing portion 332 to contact the opening and closing member 240 when the valve opening 250 is closed. The sub-sealing portion 333 may be provided integrally with the opening sealing portion 332. In particular, the sub-sealing portion 333 may be provided at the end of the guide portion 332a.

The sub-sealing portion 333 may include a protrusion 333a protruding from the end of the opening sealing portion 332. The protrusion 333a may contact the opening and closing member 240, and more particularly may contact the inclined surface 240a of the opening and closing member 240. The protrusion 333a may be arranged to be in edge contact with the opening sealing portion 332.

The outer circumferential sealing portion 331 and the opening sealing portion 332 may be manufactured as separate configurations and then combined. The outer circumferential sealing portion 331 and the opening sealing portion 332 may be bonded together by using a resin adhesive or the like. However, the present disclosure is not limited thereto, and the outer circumference sealing portion 331 and the opening sealing portion 332 may be coupled in a variety of ways.

While the present disclosure has been particularly described with reference to exemplary embodiments, it should be understood by those of skilled in the art that various changes in form and details may be made without departing from the spirit and scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A detergent supply device for a clothes treating apparatus, comprising:
   a detergent container;
   a detergent pump module including a detergent pump and configured to communicate with a valve opening;
   a valve body configured to communicate with the detergent container at one end thereof;
   a plunger configured to move within the valve body;
   an opening and closing member provided on the plunger to open or close the valve opening in response to a movement of the plunger; and
   a sealing member including:
      an outer circumferential sealing portion covering an outer circumferential surface of the valve body,
      an opening sealing portion extending from the outer circumferential sealing portion to cover at least a portion of an end of the valve body and forming the valve opening, and
      a sub-sealing portion provided integrally with the valve opening at an end of the opening sealing portion and contacting the opening and closing member when the valve opening is closed.

2. The detergent supply device of claim 1, wherein the opening sealing portion includes a guide portion extending to bend inwardly of the valve body and configured to guide the movement of the plunger.

3. The detergent supply device of claim 2, wherein the sub-sealing portion is disposed at an end of the guide portion.

4. The detergent supply device of claim 1, wherein the sub-sealing portion is formed in a ring shape along a surface on the end of the opening sealing portion facing the opening and closing member.

5. The detergent supply device of claim 1, wherein the outer circumferential sealing portion is integrally formed with the opening sealing portion.

6. The detergent supply device of claim 1, wherein the sub-sealing portion includes a protrusion protruding from the end of the opening sealing portion.

7. The detergent supply device of claim 6, wherein:
   the opening and closing member includes an inclined surface facing the end of the opening sealing portion, and the protrusion of the sub-sealing portion is configured to contact the inclined surface of the opening and closing member when the valve opening is closed.

8. The detergent supply device of claim 7, wherein the inclined surface of the opening and closing member is formed such that a width of the opening and closing member becomes narrower toward a radial direction of the plunger.

9. The detergent supply device of claim 8, wherein the protrusion of the sub-sealing portion is located in the radial direction of the plunger from a portion of the end of the opening sealing portion that contacts the opening and closing member other than the protrusion.

10. The detergent supply device of claim 6, wherein the protrusion of the sub-sealing portion is arranged to be in edge contact with the opening and closing member.

11. The detergent supply device of claim 1, wherein:
the detergent pump module further includes a valve coupling portion configured to receive the valve body, and
the sealing member is configured to seal a gap between an outer surface of the valve body and the valve coupling portion.

12. The detergent supply device of claim 1, wherein an outer surface of the valve body is configured to contact an inner surface of the outer circumferential sealing portion to support an inner side of the sealing member.

13. The detergent supply device of claim 1, wherein an outer surface of the valve body is configured to contact an inner surface of the opening sealing portion to support an inner side of the sealing member.

14. The detergent supply device of claim 12, wherein the valve body includes:
a cylindrical portion formed in a cylindrical shape with a hollow, and
an outer circumferential surface of the cylindrical portion is in contact with the inner surface of the outer circumferential sealing portion.

15. The detergent supply device of claim 1, wherein an anti-separation portion configured to secure the sealing member is formed on an outer surface of the valve body.

16. A detergent supply device of a clothes treating apparatus includes:
a detergent container,
a detergent pump module including a detergent pump configured to generate pressure for a flow of detergent, and
a valve including:
a valve body having one end in communication with the detergent container, another end provided with a valve opening in communication with the detergent pump module, and a flow path formed therein through which the detergent flows,
a plunger configured to move within the valve body,
an opening and closing member provided on the plunger and configured to open or close the valve opening in response to a movement of the plunger, and
a seal member configured to cover an outer circumferential surface of the valve body and at least a portion of the valve body on a side of the valve opening, and including a sub-sealing portion at one end of the sealing member that contacts the opening and closing member when the valve opening is closed.

17. The detergent supply device of claim 16, wherein the sub-sealing portion includes a protrusion protruding to contact the opening and closing member when the valve opening is closed.

18. The detergent supply device of claim 16, wherein the sealing member extends from a portion covering the valve opening to bend inwardly of the valve body.

19. The detergent supply device of claim 16, wherein the valve body is configured to support the sealing member by being in close contact with an inner side of the sealing member.

20. A detergent supply device of a clothes treating apparatus includes:
a detergent container,
a detergent pump module including a detergent pump and a valve coupling portion, and
a valve coupled to the valve coupling portion so as to connect the detergent container and the detergent pump module, wherein the valve includes:
a valve body configured to communicate with the detergent container,
a plunger configured to move forwardly and backwardly within the valve body,
a sealing member configured to seal a gap between the valve and the valve coupling portion and including:
an outer circumferential sealing portion covering an outer circumferential surface of the valve body,
an opening sealing portion forming a valve opening at one end of the detergent pump module of the valve body, and
a sub-sealing portion provided integrally with the opening sealing portion at an end of the opening sealing portion, and
an opening and closing member coupled to the plunger and configured to selectively open or close the valve opening in response to a movement of the plunger and contacting the sub-sealing portion when the valve opening is closed.

* * * * *